US010655819B2

(12) United States Patent
Na et al.

(10) Patent No.: US 10,655,819 B2
(45) Date of Patent: May 19, 2020

(54) LAMP FOR VEHICLE AND METHOD FOR CONTROLLING THE SAME

(71) Applicant: ZKW Group GmbH, Wieselburg (AT)

(72) Inventors: Taeyoung Na, Seoul (KR); Sangshin Park, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 100 days.

(21) Appl. No.: 15/918,303

(22) Filed: Mar. 12, 2018

(65) Prior Publication Data

US 2018/0372303 A1 Dec. 27, 2018

(30) Foreign Application Priority Data

Jun. 22, 2017 (KR) .......................... 10-2017-0079264

(51) Int. Cl.
*F21V 21/00* (2006.01)
*F21V 14/00* (2018.01)
(Continued)

(52) U.S. Cl.
CPC ............ *F21V 14/003* (2013.01); *B60Q 1/085* (2013.01); *B60Q 1/1423* (2013.01); *B60Q 1/16* (2013.01);
(Continued)

(58) Field of Classification Search
CPC . F21S 43/33; F21S 43/40; F21S 43/26; B60Q 1/1423; B60Q 1/16; F21V 14/003;
(Continued)

(56) References Cited

U.S. PATENT DOCUMENTS 4,985,816 A * 1/1991 Seko .................... B60Q 1/0023
362/303
2003/0189840 A1* 10/2003 Matsumoto ............. F21V 11/08
362/539
(Continued)

FOREIGN PATENT DOCUMENTS

DE 102008015510 10/2008
DE 102010046021 3/2012
(Continued)

OTHER PUBLICATIONS

Partial European Search Report in European Application No. 18178165.9, dated Nov. 19, 2018, 16 pages.
(Continued)

*Primary Examiner* — Laura K Tso
(74) *Attorney, Agent, or Firm* — Fish & Richardson P.C.

(57) ABSTRACT

A vehicle lamp includes: a light source unit including one or more light sources and configured to generate light; a reflector configured to reflect at least part of the light generated by the light source unit; and a lens configured to transmit therethrough a first portion of the light that is generated by the light source unit and that is reflected by the reflector to the lens. The reflector includes: a reflective part configured to reflect, to the lens, the first portion of the light generated by the light source unit; and a non-reflective part configured not to reflect, to the lens, the light generated by the light source unit. The reflective part and the non-reflective part of the reflector are configured to selectively reflect the light generated by the light source unit towards the lens to output a light distribution pattern from the vehicle lamp.

19 Claims, 23 Drawing Sheets

(51) Int. Cl.

| | | |
|---|---|---|
| *F21S 43/20* | (2018.01) | |
| *F21S 43/33* | (2018.01) | |
| *F21S 43/40* | (2018.01) | |
| *B60Q 1/14* | (2006.01) | |
| *B60Q 1/16* | (2006.01) | |
| *F21S 41/147* | (2018.01) | |
| *F21S 41/32* | (2018.01) | |
| *F21S 41/33* | (2018.01) | |
| *B60Q 1/08* | (2006.01) | |
| *F21S 41/47* | (2018.01) | |
| *F21S 41/20* | (2018.01) | |
| *F21S 41/64* | (2018.01) | |
| *G02B 27/01* | (2006.01) | |
| *B60K 35/00* | (2006.01) | |
| *F21W 102/14* | (2018.01) | |
| *F21W 102/13* | (2018.01) | |
| *F21S 41/663* | (2018.01) | |
| *F21S 41/255* | (2018.01) | |
| *F21W 105/00* | (2018.01) | |
| *F21S 45/47* | (2018.01) | |

(52) U.S. Cl.
CPC .......... *F21S 41/147* (2018.01); *F21S 41/285* (2018.01); *F21S 41/32* (2018.01); *F21S 41/333* (2018.01); *F21S 41/47* (2018.01); *F21S 41/645* (2018.01); *F21S 43/26* (2018.01); *F21S 43/33* (2018.01); *F21S 43/40* (2018.01); *B60K 35/00* (2013.01); *B60K 2370/33* (2019.05); *B60Q 2300/054* (2013.01); *B60Q 2300/056* (2013.01); *B60Q 2300/312* (2013.01); *B60Q 2300/334* (2013.01); *B60Q 2300/336* (2013.01); *B60Q 2300/41* (2013.01); *B60Q 2300/42* (2013.01); *B60Q 2300/45* (2013.01); *F21S 41/255* (2018.01); *F21S 41/663* (2018.01); *F21S 45/47* (2018.01); *F21W 2102/13* (2018.01); *F21W 2102/14* (2018.01); *F21W 2105/00* (2018.01); *G02B 27/0101* (2013.01); *G02B 2027/014* (2013.01); *G02B 2027/0138* (2013.01)

(58) Field of Classification Search
CPC ........ G02B 27/0101; G02B 2027/0138; G02B 2027/014
USPC .......................................................... 362/517
See application file for complete search history.

(56) References Cited

U.S. PATENT DOCUMENTS

| | | | |
|---|---|---|---|
| 2014/0268837 A1* | 9/2014 | Simchak | B60Q 1/12 362/465 |
| 2017/0043702 A1* | 2/2017 | Park | B60Q 1/143 |
| 2018/0195695 A1* | 7/2018 | MacIntosh | F21V 7/00 |

FOREIGN PATENT DOCUMENTS

| | | |
|---|---|---|
| DE | 102015214007 | 1/2016 |
| DE | 102015215200 | 2/2016 |
| EP | 2199664 | 6/2010 |
| EP | 2921904 | 9/2015 |
| EP | 3115683 | 1/2017 |
| JP | 2007227202 | 9/2007 |
| JP | 2011222238 | 11/2011 |
| JP | 2011238434 | 11/2011 |
| JP | 2012-069295 | 4/2012 |
| JP | 2013073691 | 4/2013 |
| JP | 2013175391 | 9/2013 |
| KR | 101342060 | 1/2014 |

OTHER PUBLICATIONS

Extended European Search Report in European Appln. No. 18178165.9, dated Feb. 5, 2019, 15 pages.

\* cited by examiner

[LHD mode-Light]

[RHD mode-Light]

[Adverse Weather mode]

860b

[Motorway mode]

860b

[AFS+Detecting mode]

860b

[Down Aiming & Detecting]

[Up Aiming & Detecting]

LAMP FOR VEHICLE AND METHOD FOR CONTROLLING THE SAME

CROSS-REFERENCE TO RELATED APPLICATION

Pursuant to 35 U.S.C. § 119(a), this application claims the benefit of an earlier filing date and right of priority to Korean Application No. 10-2017-0079264, filed on Jun. 22, 2017, the contents of which is incorporated by reference herein in its entirety.

TECHNICAL FIELD

The present disclosure relates to a lamp for a vehicle provided in the vehicle, and a method for controlling the same.

BACKGROUND

A vehicle is a machine that a user may control to move in a desired direction. A typical example of a vehicle is an automobile.

A vehicle typically implements various sensors, electronic devices, and the like, for convenience of users of vehicles. In particular, research into an advanced driver assistance system (ADAS) has been actively conducted for driving convenience of users. In addition, autonomous vehicles have been actively developed.

Vehicles typically have various types of lamp. In general, a vehicle has various types of vehicle lamps that implement a lighting function to facilitate viewing an object positioned around the vehicle when driving at night, or that implement a signal function indicating a driving state of the vehicle to other vehicles or pedestrians.

For example, a vehicle may be configured to directly emit light using a lamp, such as a headlight that irradiates light to a front side to secure a visual field of a driver, or a brake light that is activated when the driver performs a brake control, or a turn signal light that signals a right turn or left turn.

As another example, a vehicle may include a reflector for reflecting light to allow the vehicle to be easily recognized, and may be installed on a front or rear side of the vehicle.

In general, vehicle lamps are designed to meet certain specifications, for example as specified by installation references and standards defined by regulations to sufficiently perform each function.

Recently, as research into ADAS has been actively developed, interest as grown in developing technologies configured to improve user convenience and safety.

As part of such technologies, vehicle lamps configured to output light in various manners in conjunction with ADAS operations have been actively developed.

SUMMARY

Implementations disclosed herein enable a vehicle lamp that is configured to selectively generate various light distribution patterns.

In one aspect, a vehicle lamp includes: a light source unit comprising one or more light sources and that is configured to generate light; a reflector configured to reflect at least part of the light that is generated by the light source unit; and a lens configured to transmit therethrough a first portion of the light that is generated by the light source unit and that is reflected by the reflector to the lens. The reflector includes: a reflective part that is configured to reflect, to the lens, the first portion of the light that is generated by the light source unit; and a non-reflective part that is configured not to reflect, to the lens, the light that is generated by the light source unit. The reflective part and the non-reflective part of the reflector are configured to selectively reflect the light that is generated by the light source unit towards the lens to output a light distribution pattern from the vehicle lamp.

In some implementations, the light source unit comprises a first light source part and a second light source part that are oriented to output light in different directions towards the reflector, and the reflector comprises: a first surface configured to reflect first light generated by the first light source part of the light source unit; and a second surface configured to reflect second light generated by the second light source part of the light source unit.

In some implementations, the first surface and the second surface of the reflector are arranged to face opposite directions.

In some implementations, the reflector extends longitudinally along a central axis of the lens so that the first surface and the second surface of the reflector face in directions that are perpendicular to the central axis of lens.

In some implementations, the first surface of the reflector comprises: a high-beam reflective part that is configured to reflect, to the lens, a partial amount of the first light that is generated by the first light source part of the light source unit; and a high-beam non-reflective part that is configured not to reflect, to the lens, the first light that is generated by the first light source part of the light source unit. The high-beam reflective part and the high-beam non-reflective part of the first surface of the reflector are configured to selectively reflect the first light that is generated by the first light source part towards the lens to output a high-beam light distribution pattern from the vehicle lamp.

In some implementations, the high-beam non-reflective part of the first surface of the reflector comprises a planar surface, and the high-beam reflective part of the first surface of the reflector comprises at least one curved surface having a first curvature.

In some implementations, the vehicle lamp further includes: a first light-transmissive shield disposed on the first surface of the reflector and overlapping at least a portion of the high-beam reflective part of the first surface of the reflector, and configured to selectively transmit therethrough, to the underlying high-beam reflective part of the first surface of the reflector, at least a partial amount of the first light that is generated by the first light source part of the light source unit; and at least one processor configured to control a light transmittance of the first light-transmissive shield to selectively transmit therethrough light to form any one of a plurality of high-beam light distribution patterns that is output from the vehicle lamp.

In some implementations, the vehicle lamp further includes: a communication unit configured to receive at least one signal from at least one electronic component provided in a vehicle. The at least one processor is configured to select a high-beam light distribution pattern based on a signal received through the communication unit.

In some implementations, the second surface of the reflector comprises: a low-beam reflective part that is configured to reflect, to the lens, a partial amount of the second light that is generated by the second light source part of the light source unit; and a low-beam non-reflective part that is configured not to reflect, to the lens, the second light that is generated by the second light source part of the light source unit. The low-beam reflective part and the low-beam non-reflective part of the second surface of the reflector are configured to selectively reflect the second light that is generated by the second light source part towards the lens to output a low-beam light distribution pattern from the vehicle lamp.

In some implementations, the vehicle lamp further includes: a second light-transmissive shield disposed on the second surface of the reflector and overlapping at least a portion of the low-beam reflective part of the second surface of the reflector, and configured to selectively transmit therethrough, to the underlying low-beam reflective part of the second surface of the reflector, at least a partial amount of the second light that is generated by the second light source part of the light source unit; and at least one processor configured to adjust a light transmittance of the second light-transmissive shield to form any one of a plurality of low-beam light distribution patterns that is output from the vehicle lamp.

In some implementations, the vehicle lamp further includes: a light-transmissive shield disposed to overlap at least a portion of the reflective part of the reflector, and arranged between the reflector and the light source unit, and configured to have a variably-controlled light transmittance.

In some implementations, the vehicle lamp further comprises: at least one processor configured to control the light-transmissive shield to variably control the light transmittance of the light-transmissive shield according to a selected light distribution pattern among a plurality of light distribution patterns, so that the light-transmissive shield selectively transmits therethrough the light that is generated by the light source unit to output the selected light distribution pattern from the vehicle lamp.

In some implementations, the light-transmissive shield comprises a first shield part having a first light transmittance and a second shield part having a second light transmittance. A position and a size of at least one of the first shield part or the second shield part of the light-transmissive shield are configured to be variably controlled according to the selected light distribution pattern.

In some implementations, the at least one processor is configured to control the light-transmissive shield to variably control the light transmittance of the light-transmissive shield according to the selected light distribution pattern by: adjusting the light transmittance of the light-transmissive shield to output the selected light distribution pattern from the vehicle lamp with a gradated transmittance across a cut-off line, wherein a first side of the cut-off line of the selected light distribution pattern is illuminated with a first light transmittance, the cut-off line of the selected light distribution pattern is illuminated with a second light transmittance less than the first light transmittance, and a second side of the cut-off line, opposite the first side, of the selected light distribution pattern is illuminated with a third light transmittance less than the second light transmittance.

In some implementations, the light-transmissive shield comprises a plurality of pixels having a predetermined size, and each pixel is configured to have an individually controllable light transmittance.

In some implementations, the plurality of pixels of the light-transmissive shield are arranged in a matrix form.

In some implementations, the non-reflective part of the reflector is anodized.

In some implementations, the non-reflective part of the reflector is colored to have a predetermined color.

In some implementations, the reflective part of the reflector is composed of aluminum.

In another aspect, a vehicle lamp includes: a first light source part configured to be oriented to output first light in a first direction; a second light source part configured to be oriented to output second light in a second direction different from the first direction; a reflector including: a first surface configured to reflect the first light generated by the first light source part; and a second surface configured to reflect the second light generated by the second light source part; and a lens configured to transmit therethrough at least a portion of light that is reflected by the reflector. The vehicle lamp further comprises: a light-transmissive shield disposed to overlap at least a portion of the first surface of the reflector, and configured with a light transmittance that is variably controllable; and at least one processor configured to control the light transmittance of the light-transmissive shield to selectively transmit therethrough light to form any one of a plurality of light distribution patterns that is output from the vehicle lamp.

Further scope of applicability of the present application will become more apparent from the detailed description given hereinafter. However, it should be understood that the detailed description and specific examples, while indicating preferred implementations of the disclosure, are given by way of illustration only, since various changes and modifications within the scope of the disclosure will become apparent to those skilled in the art from the detailed description.

DETAILED DESCRIPTION

Figure 1:
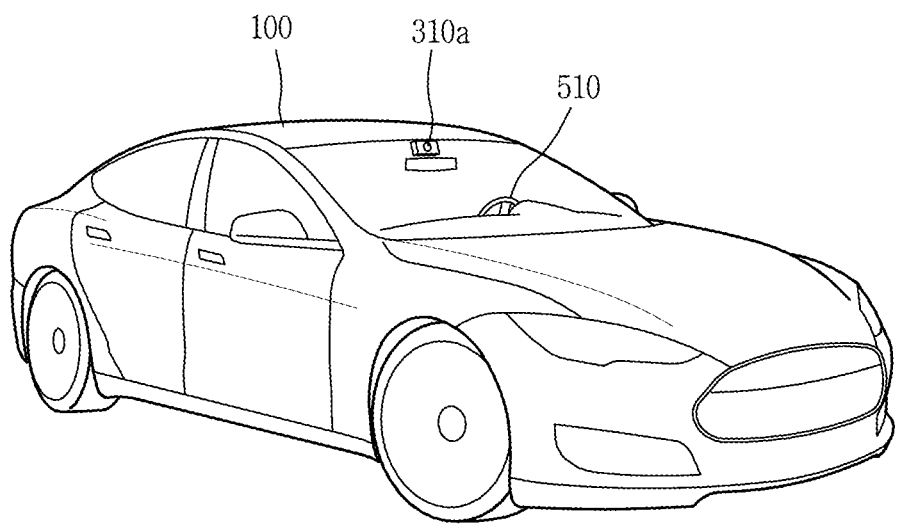
FIG. 1 is a diagram illustrating an example of an appearance of a vehicle according to an embodiment of the present disclosure.
Figure 1:
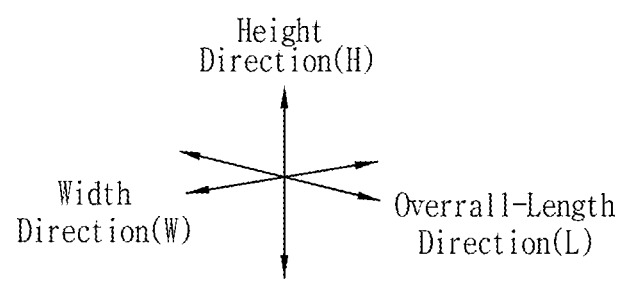

Implementations disclosed herein enable a vehicle lamp that is configured to selectively generate different light distribution patterns using a lamp structure that is both simplified and also more adaptable.

A vehicle lamp may include a light source unit and one or more adjustable components that are configured to generate a variety of light distribution patterns. In some implementations, a vehicle lamp may be configured to selectively illuminate different regions outside the vehicle with different light intensities, for various reasons including safety of other drivers and selectively improved recognition of important features or areas outside the vehicle. For example, a vehicle lamp may be configured to generate a light distribution pattern having both a high-illumination area (e.g., a high-beam area) and a lower-illumination area (e.g., a low-beam area), separated by a cut-off line, or boundary line, therebetween.

In some vehicle lamps, such a cut-off line may be implemented by a shield in the vehicle lamp that merely blocks a portion of light generated by the light source unit. However, in such scenarios, the shield may cause a stark difference in brightness between different illumination regions on opposite sides of the cut-off line in the light distribution pattern. This may be problematic, for example by inducing fatigue to the driver's eyes.

Implementations disclosed herein may address such challenges by enabling a vehicle lamp that utilizes a selectively adjustable light-transmissive shield that generates light distribution patterns having a cut-off line with a gradation effect. As such, instead of merely completely blocking or completely transmitting light generated by the light source unit, the light-transmissive shield may selectively apply different transmittances to generate a more gradated light distribution pattern. Thus, in some scenarios, fatigue of the driver's eyes may be alleviated by a more gradated cut-off line.

In some implementations, the vehicle lamp may implement a reflector having a first surface and a second surface to serve as a shield forming a high beam light distribution pattern and a low beam light distribution pattern. In addition, in some implementations, the vehicle lamp may include a light-transmissive shield that is disposed to overlap one surface of the reflector, to further provide selective filtering of light to generate various light distribution patterns.

Such implementations may enable a vehicle lamp that has a simplified structure, and also that is configured to output light in an improved manner, both in terms of safety and adaptability. The vehicle lamp may also be configured to output a beam pattern in an improved manner. In some implementations, the vehicle lamp may be configured to output a low beam pattern in an improved manner when a low beam is output. The vehicle lamp may also be configured to control a beam pattern in a peripheral region of a cut-off line in various manners. In some implementations, the vehicle lamp may be configured to output a high beam pattern in an improved manner when a high beam is output.

In some scenarios, a vehicle lamp and a vehicle including the same according to some implementations of the present disclosure may have the following advantages.

Since the reflector having a first surface and a second surface serves as a shield forming a high beam light distribution pattern and a low beam light distribution pattern, the vehicle lamp having a simple structure may be provided.

In addition, various light distribution patterns may be formed by the light-transmissive shield which may be adjusted in its light transmittance, and since the light-transmissive shield is disposed to overlap one surface of the reflector, the overall size of the vehicle lamp may be reduced.

A vehicle according to an implementation of the present disclosure may be any suitable motorized vehicle such as a car, a motorcycle, and the like. Hereinafter, an example of a vehicle will be described based on a car.

The vehicle according to the implementation of the present disclosure may include an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an implementation of the present disclosure.

Figure 2:
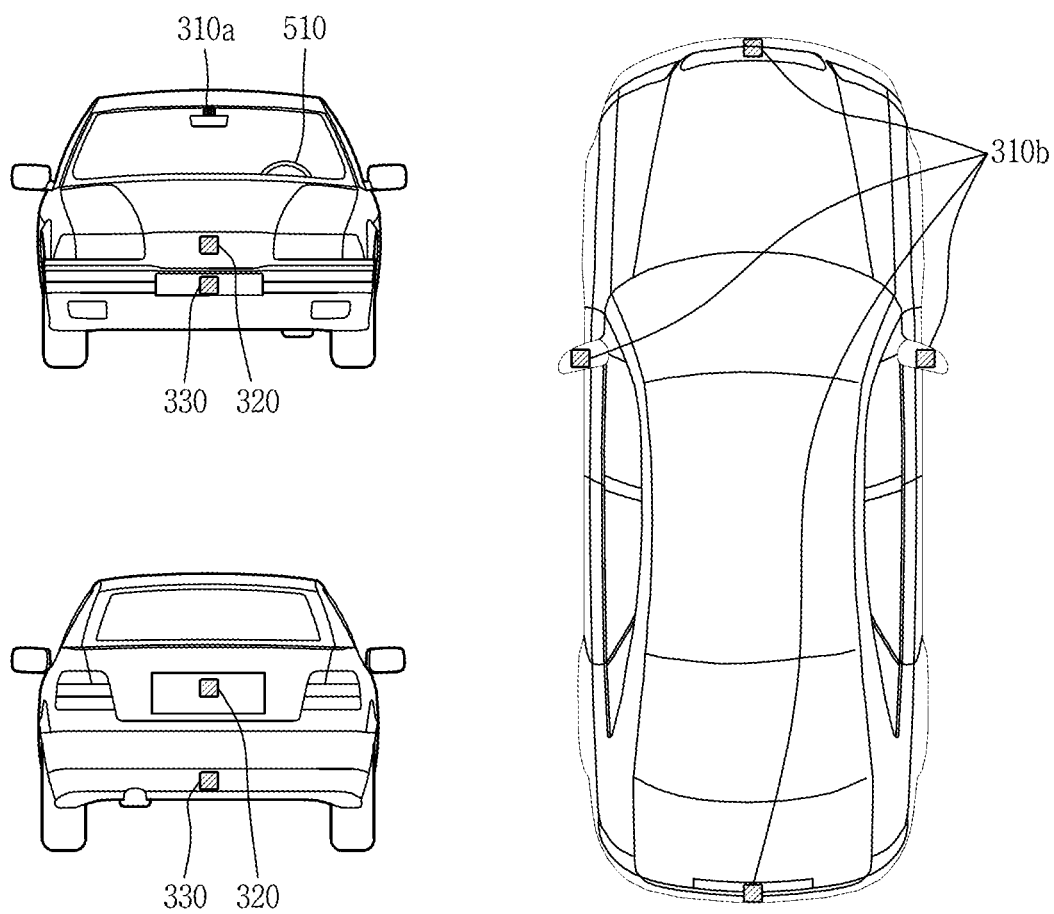
FIG. 2 is a diagram illustrating an example of a vehicle according to an implementation of the present disclosure viewed at various angles.

FIG. 2 is a view illustrating appearance of a vehicle at various angles in accordance with an implementation of the present disclosure.

Figure 3:
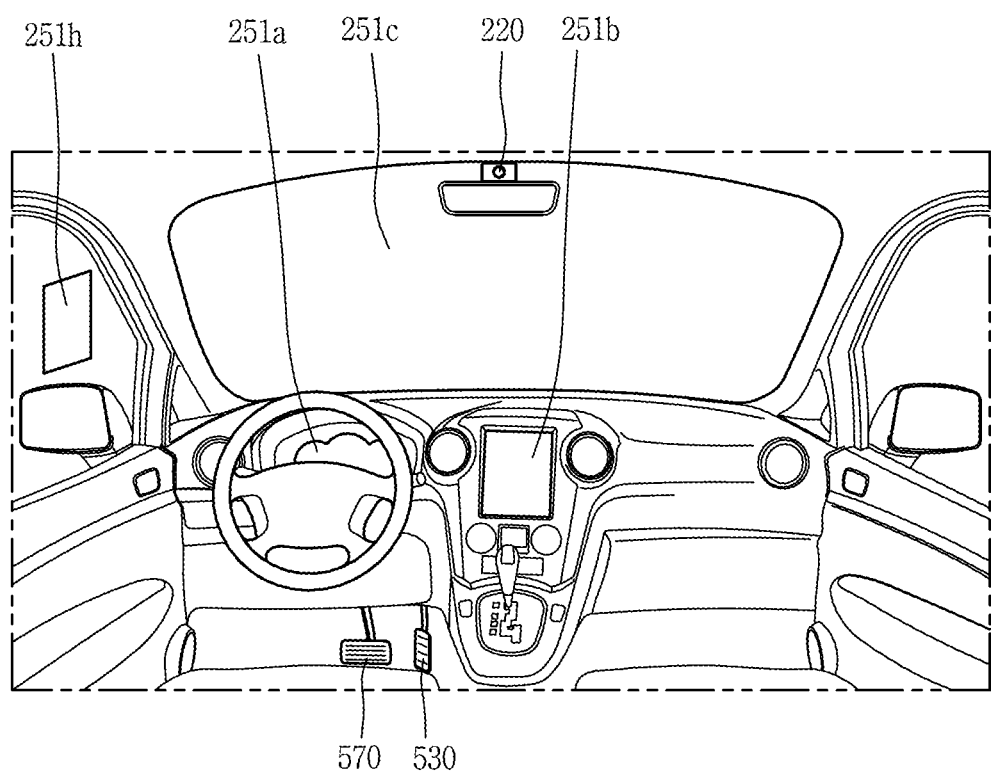
FIGS. 3 and 4 are diagrams illustrating examples of the inside of a vehicle according to an implementation of the present disclosure.
Figure 4:
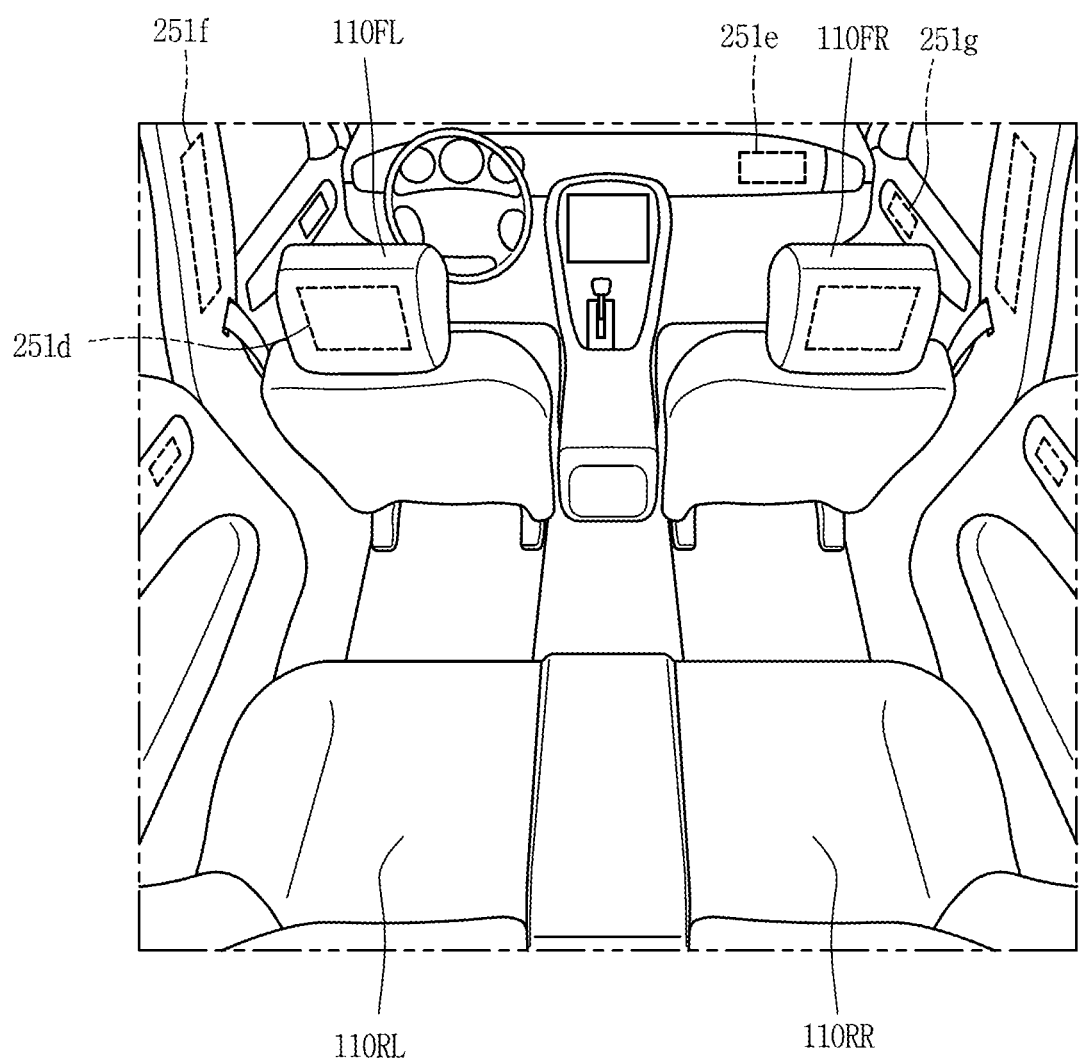

FIGS. 3 and 4 are views illustrating an inside of a vehicle in accordance with an implementation of the present disclosure.

Figure 5:
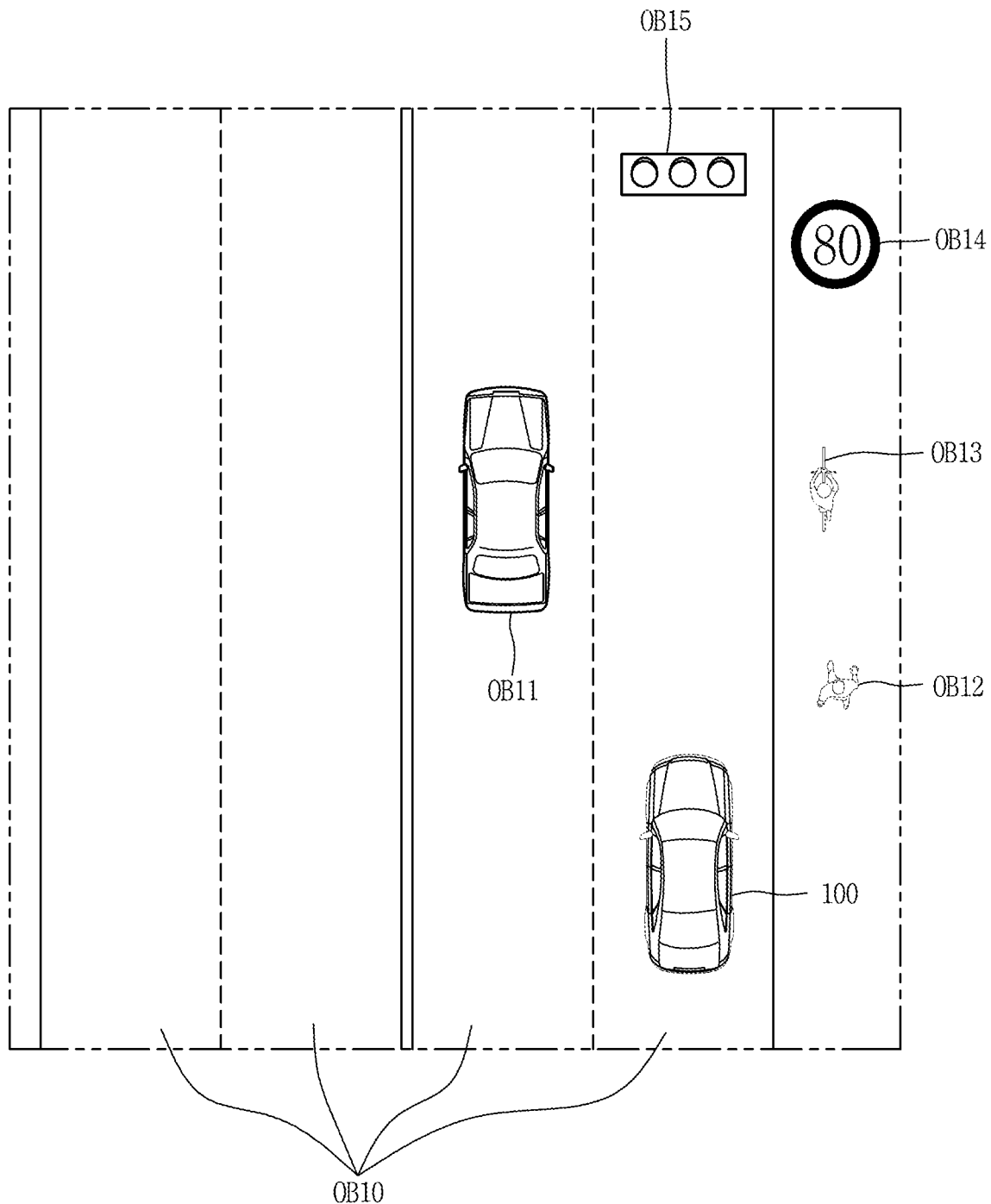
FIGS. 5 and 6 are diagrams illustrating examples of an object detected by a vehicle according to an implementation of the present disclosure.
Figure 6:
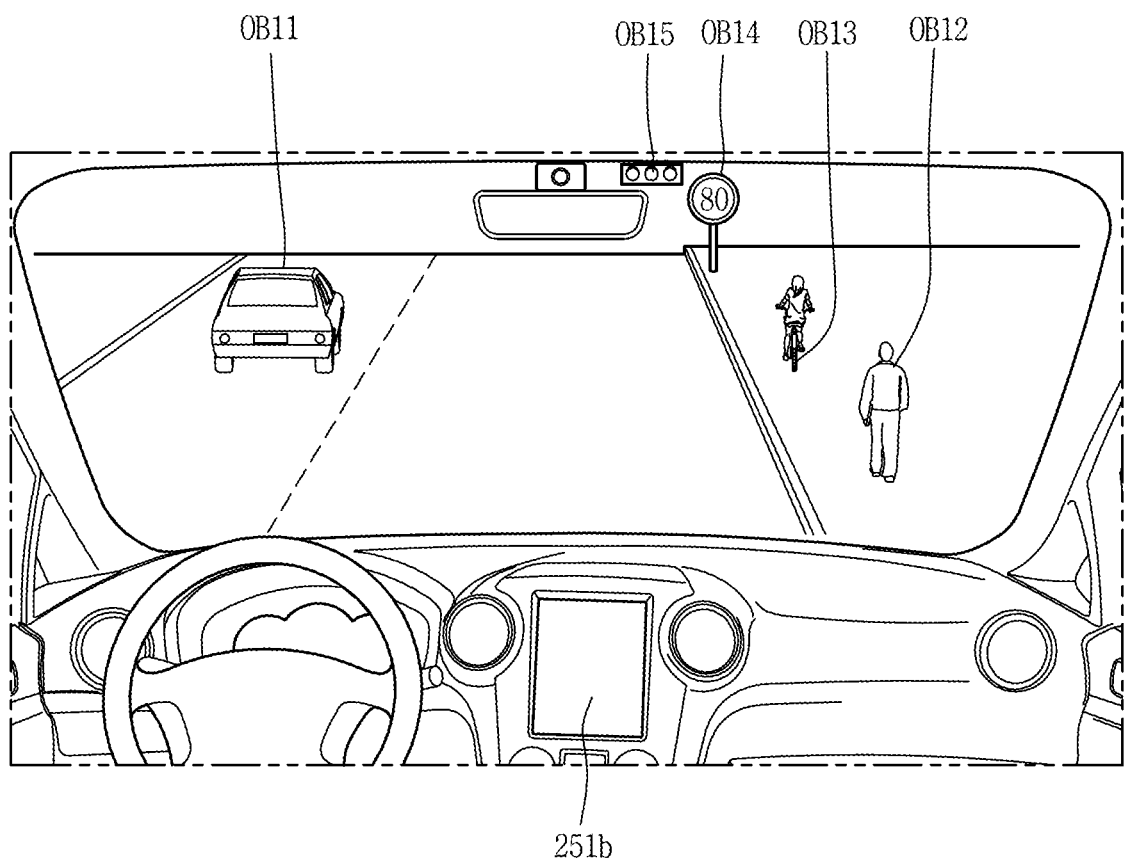

FIGS. 5 and 6 are reference views illustrating objects in accordance with an implementation of the present disclosure.

Figure 7:
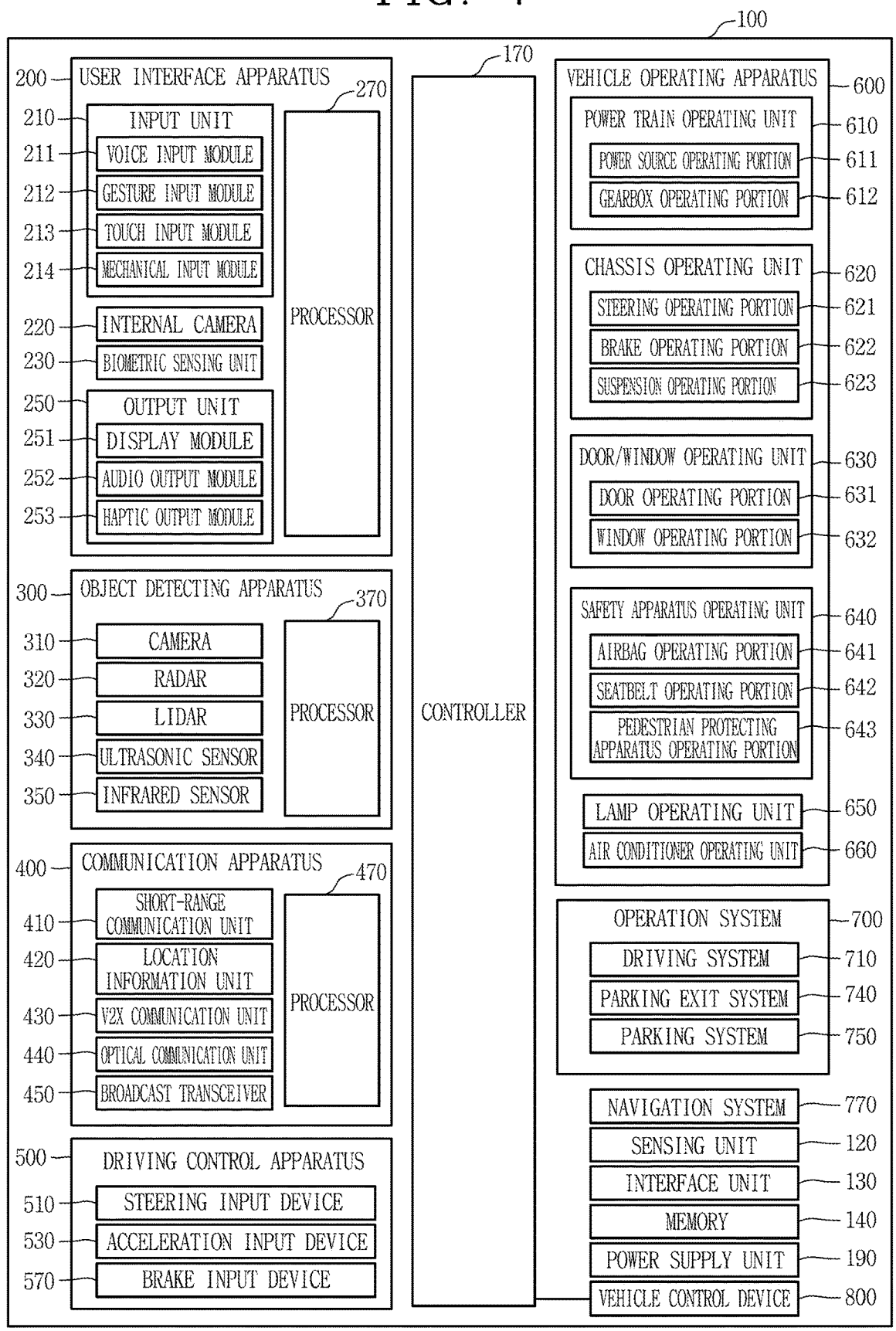
FIG. 7 is a block diagram illustrating an example of a vehicle according to an implementation of the present disclosure.

FIG. 7 is a block diagram illustrating a vehicle in accordance with an implementation of the present disclosure As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, at least one processor such as a controller 170, and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250, and at least one processor such as processor 270.

According to implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be another vehicle, a pedestrian, or other moving object. The fixed object may be a traffic signal, a road, a structure, or other stationary object.

The object detecting apparatus 300 may include a camera 310, a radar 320, a LiDAR 330, an ultrasonic sensor 340, an infrared sensor 350, and at least one processor such as processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and at least one processor such as processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include at least one processor. Each unit of the vehicle operating apparatus 600 may individually include at least one processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include at least one processor. Each unit of the vehicle operating apparatus 600 may individually include at least one processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to implementations, the operation system 700 may further include other components in addition to components to be described, or may not include some of the components to be described.

In some implementations, the operation system 700 may include at least one processor. Each unit of the operation system 700 may individually include at least one processor.

According to implementations, the operation system may be implemented by at least one processor such as the controller 170 when it is implemented in a software configuration.

According to implementation, the operation system 700 may include at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and at least one processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 related to the present disclosure may include a vehicle lamp 800. In detail, the vehicle lamp 800 may include every lamp provided in the vehicle 100.

The vehicle lamp 800 may include a head lamp provided on a front side of the vehicle 100. The head lamp may be provided in at least one of a front left side of the vehicle 100 and a front right side of the vehicle 100. The head lamp may be formed to output (irradiate, discharge, emit, or generate) light to at least one of the front side, the front left side, and the front right side of the vehicle 100.

The head lamp may include at least one of a low beam output module (low beam), a high beam output module (high beam), a winker, an emergency light, a fog light, and a corner light.

Also, the vehicle lamp 800 may include a rear lamp (or a rear combination lamp) provided on the rear side of the vehicle 100. The rear lamp may be provided on at least one of a rear left side of the vehicle 100 and a rear right side of the vehicle 100, or may be integrally provided on a rear surface of the vehicle 100. The rear lamp may be formed to output (irradiate, discharge, emit, or generate) to at least one of the rear side, the rear left side, and the rear right side of the vehicle 100.

The rear lamp may include at least one of a brake light, a backup light, a winker, and taillight.

Also the vehicle lamp 800 may include a side lamp provided on the side of the vehicle. For example, the side lamp may include a winker (or an emergency light) provided at a side mirror of the vehicle.

Also, the vehicle lamp 800 of the present disclosure may be disposed to be adjacent to a lamp module forming a high or low beam pattern, a positioning lamp, a daytime running lamp (DRL), an adaptive front lighting system (AFLS), and the like, and may be provided as a separate form.

In this manner, the vehicle lamp 800 described in this disclosure may be applied to any type of lamp which can be provided in the vehicle. The vehicle lamp 800 will be described in detail hereinafter.

Figure 8A:
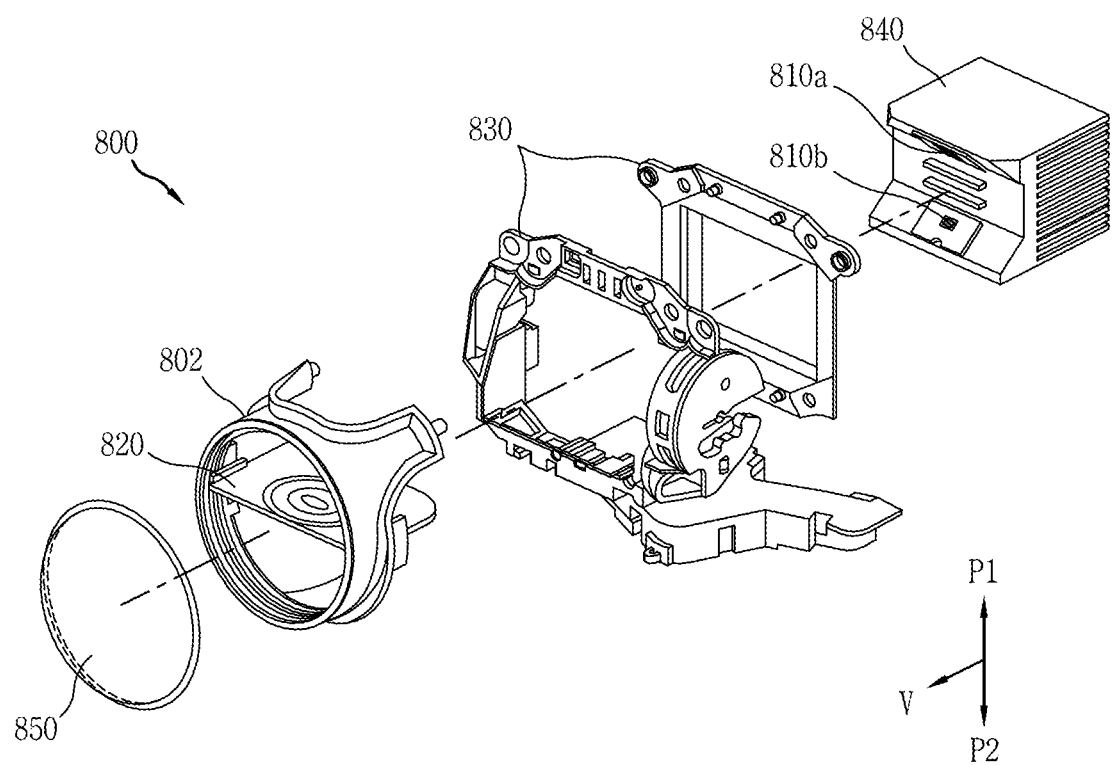
FIGS. 8A, 8B, and 8C are diagrams illustrating examples of an exploded perspective view, a side view, and a cross-sectional view of a vehicle lamp according to an implementation of the present disclosure.
Figure 8B:
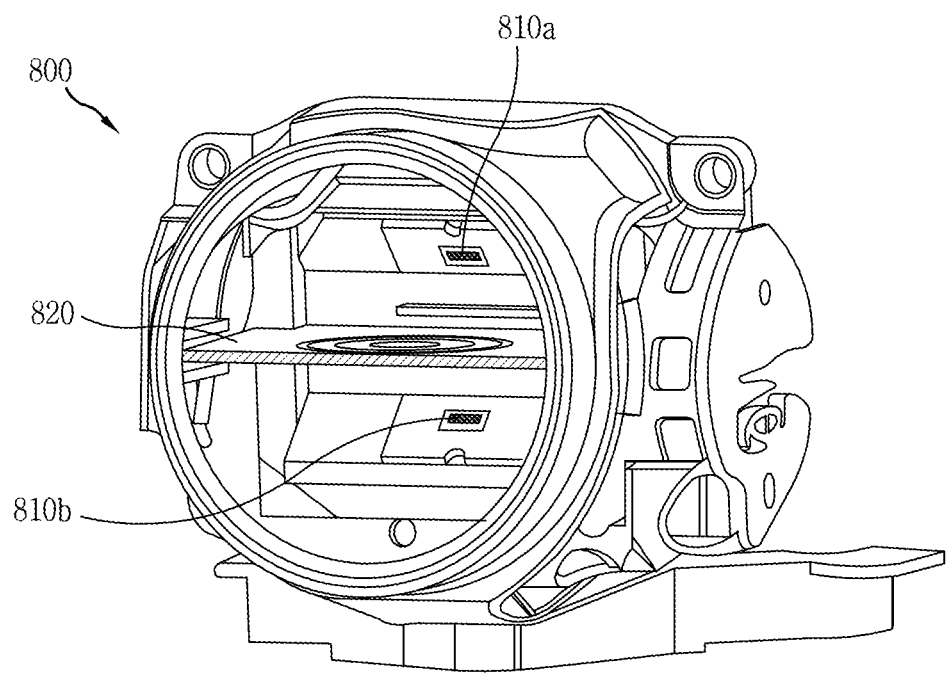
Figure 8C:
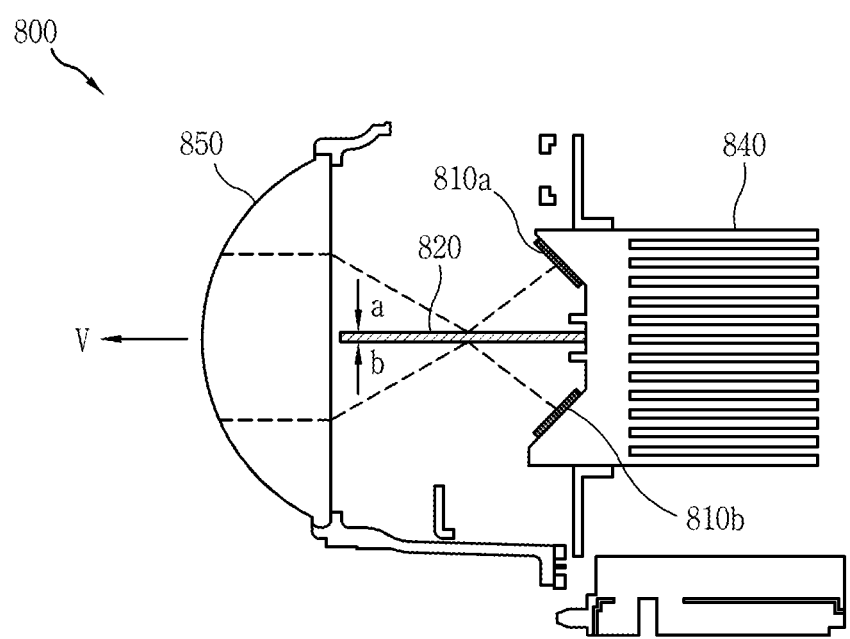

FIGS. 8A, 8B, and 8C are diagrams illustrating examples of an exploded perspective view, a side view, and a cross-sectional view of a vehicle lamp according to an implementation of the present disclosure.

Referring to FIG. 8A, the vehicle lamp 800 may include a light source parts 810*a* and 810*b*, a reflector 820, a heat sink 840, a lens 850, and at least one processor such as processor 870.

In the present disclosure, a direction in which the vehicle lamp 800 outputs light will be defined as a front side. In detail, a front side (V) may refer to a direction in which light output from a light source of the vehicle lamp 800 is irradiated through the lens 850. For example, the front side may correspond to a direction towards which a central axis of the lens 850 extends, as an optical axis of light generated by a light source part 810 and traveling to a front surface of the vehicle lamp.

The light source unit 810 includes one or more light sources. In some implementations, the light source unit 810 may include a light source and a circuit board configured to control the light source, and the circuit board may be connected to a heat sink.

In some implementations, the light source unit 810 may include a first light source part 810*a* and a second light source part 810*b* facing in different directions.

For example, as shown in the examples of FIGS. 8A-8C, the first light source part 810*a* is a high beam light source part disposed to be oriented in a first direction and the second light source unit 810*b* may be a low beam light source part disposed to be oriented in a second direction.

In these examples, the first direction may be defined as a direction toward one surface of the reflector 820 (to be described hereinafter) and the second direction may be defined as a direction toward the other surface of the reflector 820.

A light source of the light source unit 810 generating light may be variously implemented. For example, the light source may be a halogen light source, a light emitting diode (LED), a micro LED, a matrix LED, a laser diode (LD), and the like, and may include any suitable type of implementations which may generate light.

The reflector 820 is configured to reflect light generated by the light source unit 810 to the lens 850. In detail, the reflector 820 includes one surface configured to reflect first light generated by the first light source part 810a to the lens 850 and the other surface configured to reflect second light generated by the second light source 810b to the lens 850.

The reflector 820 is configured to extend along the central axis V of the lens 850, and one surface and the other surface of the reflector 820 face in a direction perpendicular to the central axis F of the lens 850. For example, one surface of the reflector 820 may face in a first direction P1, and the other surface of the reflector 820 may face in a second direction P2 opposite to the first direction P1. The second direction P2 may be a gravity direction. Accordingly, one surface and the other surface of the reflector 820 may face in mutually opposite directions.

First light generated by the first light source part 810a may be reflected by one surface of the reflector 802 to form a high beam light distribution pattern, and second light generated by the second light source part 810b may be reflected by the other surface of the reflector 802 to form a low beam light distribution pattern.

The light source unit 810 and the reflector 820 may be connected to the heat sink 840. The heat sink 840 may include a plurality of recesses, and at least a portion of the light source unit 810 and at least a portion of the reflector 820 may be inserted into the recesses of the heat sink 840.

The heat sink 840 serves to perform heat dissipation on the light source unit 810 and/or the reflector 820.

The lens 850 is configured to allow light reflected by the reflector 820 to transmit therethrough. As illustrated in FIG. 8B, the user may check the inside of the vehicle lamp 800 through the lens 850.

The heat sink 840, the lens 850, and the reflector 820 may be fixed to each other by a holder 802 and/or a bracket 830.

In some implementations, the vehicle lamp 800 may include at least one processor for controlling components of the vehicle lamp 800. The at least one processor may include the lamp driver 650 or the controller 170 described above with reference to FIG. 7. Also, the at least one processor may include a separate processor provided in the vehicle lamp.

In this disclosure, a case in which a processor for controlling the vehicle lamp 800 is included in the vehicle lamp 800 will be described as an example, and 870 will be given to the processor, as a reference numeral.

However, the present disclosure is not limited thereto and every contents/function/features related to the processor 870 described in this disclosure may be performed by the lamp driver 650 or the controller 170.

The processor 870 may receive a control signal for controlling the vehicle lamp 800 or generate a control signal for controlling the vehicle lamp 800 on the basis of an advanced driver assistance system (ADAS).

In detail, the vehicle lamp 800 may further include a communication unit configured to receive various signals from an electric/electronic component provided in the vehicle. The communication unit is configured to perform communication with various components described above with reference to FIG. 7. For example, the communication unit may receive various types of information provided through a controller area network (CAN).

The processor 870 may select any one of a plurality of light distribution patterns on the basis of a signal received through the communication unit, and control the light source unit 810 and a light-transmissive shield 860 (to be described hereinafter with reference to FIG. 11) to form the selected light distribution pattern.

The vehicle lamp 800 may create various light distribution patterns.

Here, a light distribution pattern refers to a pattern created as light emitted from the vehicle lamp 800 reaches an object positioned outside of the vehicle 100, and may be defined as a spatial distribution of lighting generated by the light source. When the vehicle lamp 800 forms a light distribution pattern, a boundary line of the light distribution pattern may be defined by connecting points having reference brightness, and the light distribution pattern may be defined by the boundary line.

For example, when the vehicle lamp 800 emits light toward a screen positioned on a front side in a state in which the vehicle lamp 800 is disposed in the vehicle 100 or in a state in which the vehicle lamp 800 is fixed under the same condition in which the vehicle lamp 800 is disposed in the vehicle, the light distribution pattern may be checked through an image formed on the screen.

The vehicle lamp 800 may form different light distribution patterns on the basis of traveling (or driving) information of the vehicle. In detail, at least one light distribution pattern may be selected according to traveling information of the vehicle, and the vehicle lamp 800 is driven to form the selected light distribution pattern. For example, at least one light source unit 810 may be turned on or off according to the selected light distribution pattern. The light source unit 810 which is turned on or off may be varied or a shield for shielding light generated by the optical unit 810 may be driven in different manners.

Each light distribution pattern may be called a mode having a predetermined name. For example, a light distribution pattern created when it rains to be greater than a reference may be called an "adverse weather mode", and a light distribution pattern created when the vehicle travels at a speed faster than a reference speed may be called a "motorway mode". In other words, when a first light distribution pattern is formed, it may mean that a first light distribution mode corresponding to the first light distribution pattern is turned on. When the first light distribution pattern is switched to a second light distribution pattern, it may mean that the first light distribution mode is turned off and a second light distribution mode corresponding to the second light distribution pattern is turned on. Also, a plurality of light distribution modes may be simultaneously turned on to form a plurality of light distribution patterns in an overlapping manner.

Each mode may be automatically turned on or off depending on whether vehicle travelling information satisfies a predetermined condition set in each mode or may be manually turned on or off by a user input.

Hereinafter, one surface and the other surface of the reflector 820 will be described in detail. Referring to FIG. 8C, one surface of the reflector 820 refers to a surface 820a viewed in a direction "a" and the other surface of the reflector 820 refers to a surface 820b viewed in a direction "b."

Figure 9:
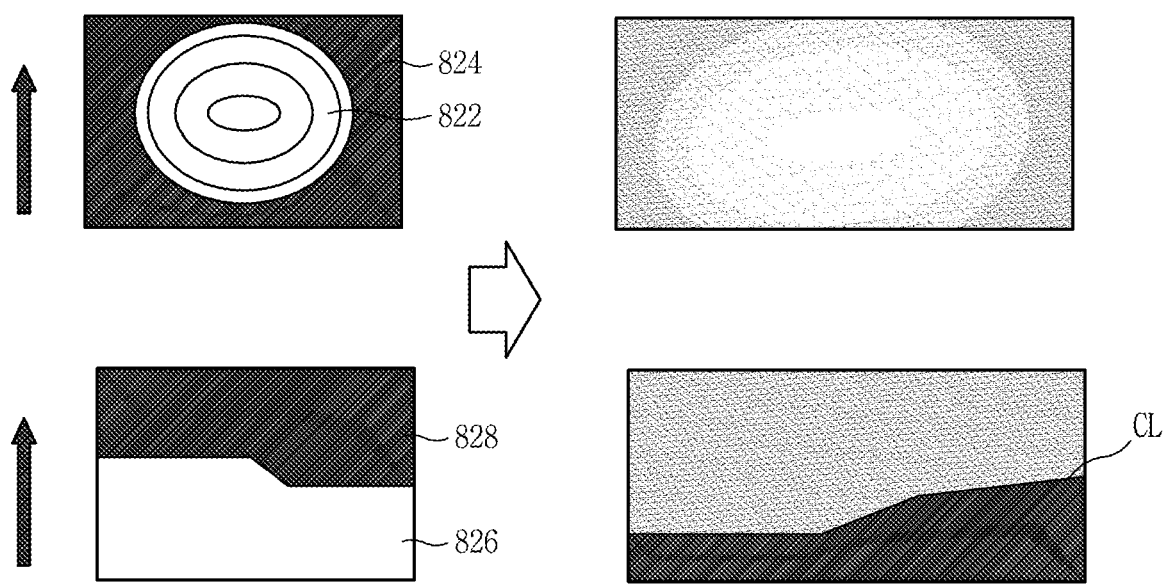
FIG. 9 is a diagram illustrating an example of one surface and another surface of a reflector according to an implementation of the present disclosure.

FIG. 9 is a diagram illustrating an example of one surface and the other surface of a reflector according to an implementation of the present disclosure.

The reflector 820 may include a reflective part and a non-reflective part. The reflective part is configured to reflect a partial amount of the light that is generated by the light source unit 810 to the lens 850. The non-reflective part is configured not to reflect a partial amount of the light that is generated by the light source unit 810 to the lens 850. As such, light that is generated by the light source unit 850 may form a preset light distribution pattern due to the reflective part and the non-reflective part.

The reflective part is configured to reflect light to form a light arrival portion of a light distribution pattern. In some implementations, the reflective part may be formed of aluminum, but generally may be formed of any suitable reflective material. In some implementations, the reflective part may be formed by depositing or coating aluminum on the reflector 820.

In contrast, the non-reflective part corresponds to a part that is configured not to reflect light, thus forming a light non-arrival portion of a light distribution pattern. In some implementations, the non-reflective part may be anodized. In addition or as an alternative, the non-light reflective part may be colored (or painted) with dye of a predetermined color to achieve non-reflection of light. For example, the dye may be black.

The reflective part and the non-reflective part may be formed on a first surface 820*a* and/or on a second surface 820*b* of the reflector 820. The reflective part and the non-reflective part formed on one surface 820*a* of the reflector 820 will be referred to as a "high beam reflective part" and a "high beam non-reflective part", respectively. A reflective part and a non-reflective part formed on the other surface 820*b* of the reflector 820 will be referred to as a "low beam reflective part" and a "low beam non-reflective part", respectively.

The reflector 820 may have at least one of both a reflective part and a non-reflective part for a high beam, and a reflective part and a non-reflective part for a low beam.

Referring to FIG. 9, one surface 820*a* of the reflector 820 may include a high beam reflective part 822 and a high beam non-reflective part 824. The high beam reflective part 822 is configured to reflect, to the lens 850, a partial amount of first light that is generated by the first light source part 810*a*. The high beam non-reflective part 824 is configured not to reflect, to the lens 850, a partial amount of the first light.

For example, if a region of the reflector 820 to which the first light is irradiated is defined as an entire region, the entire region may be divided into the high beam reflective part 822 and the high beam non-reflective part 824. As such, the first light forms a high beam light distribution pattern due to the first surface 820*a* of the reflector 820.

The second surface 820*b* of the reflector 820 may include a low beam reflective part 826 configured to reflect a partial amount of second light generated by the second light source part 810*b* to the lens 850, and also a low beam non-reflective part 828 configured not to reflect a partial amount of the second light to the lens 850. As such, the second light forms a low beam light distribution pattern due to the other surface 820*b* of the reflector 820.

The second surface 820*b* of the reflector 820 may be divided into two parts by the low beam reflective part 826 and the low beam non-reflective part 828. A boundary line between the low beam reflective part 826 and the low beam non-reflective part 828 forms a cut-off line CL of a low beam light distribution pattern.

Figure 10:
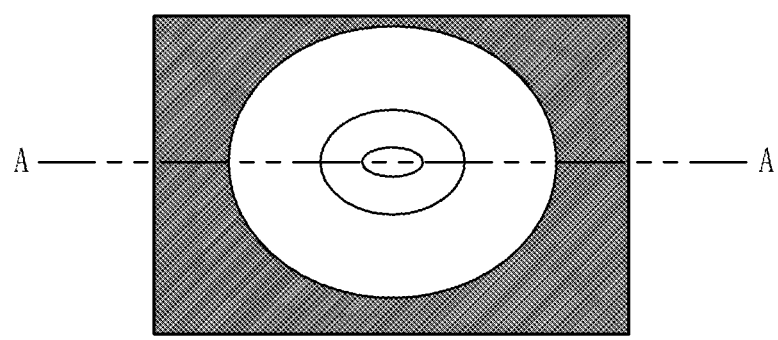
FIG. 10 is a diagram illustrating an example of a cross-sectional view of the reflector of FIG. 9.
Figure 10:
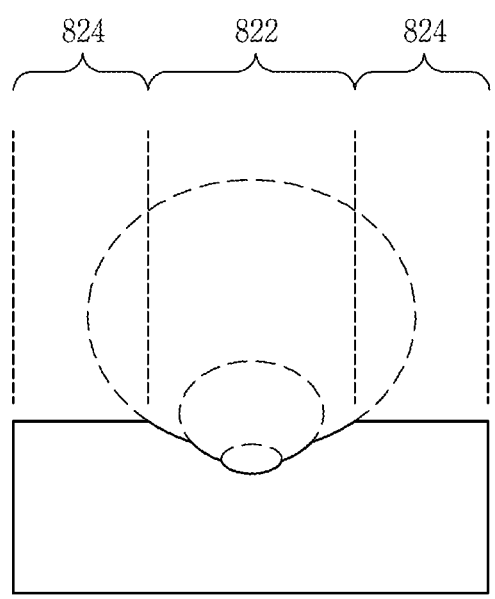

FIG. 10 is an example of a cross-sectional view of the reflector of FIG. 9. In particular, a cross-sectional view of the reflector 820, taken along line A-A', is illustrated in the example of FIG. 10.

In some implementations, the high beam non-reflective part 824 may be formed to be plane and the high beam reflective part 822 may have at least one curved surface having predetermined curvature. The high beam reflective part 822 may include a first curved surface having first curvature and a second curved surface connected to the first curved surface and having second curvature such that a larger amount of light concentrates on a central portion of a high beam light distribution pattern. Since the first curvature is greater than the second curvature, first light may concentrate on the central portion of the high beam light distribution pattern. The reflector 820 of FIG. 10 is an example and the high beam reflective part 822 may have a reflective surface having various shapes.

In this manner, since the reflector 820 includes the reflective part and the non-reflective part, the reflector 820 may also serve to form a light distribution pattern, a function that would otherwise be performed by a shield. In some implementations, a shield need not necessarily be implemented in the vehicle lamp 800 due to the function of the reflector 820, and therefore the structure of the vehicle lamp 800 may be simplified and production cost may be reduced.

In some implementations, the vehicle lamp 800 according to the present disclosure may further include a light-transmissive shield overlapping the reflective part of the reflector 820. The vehicle lamp 800 may generate a light distribution pattern in a fixed shape by the reflective part and the non-reflective part, and may dynamically generate light distribution patterns in various shapes using the light-transmissive shield.

Hereinafter, the light-transmissive shield will be described in detail.

Figure 11A:
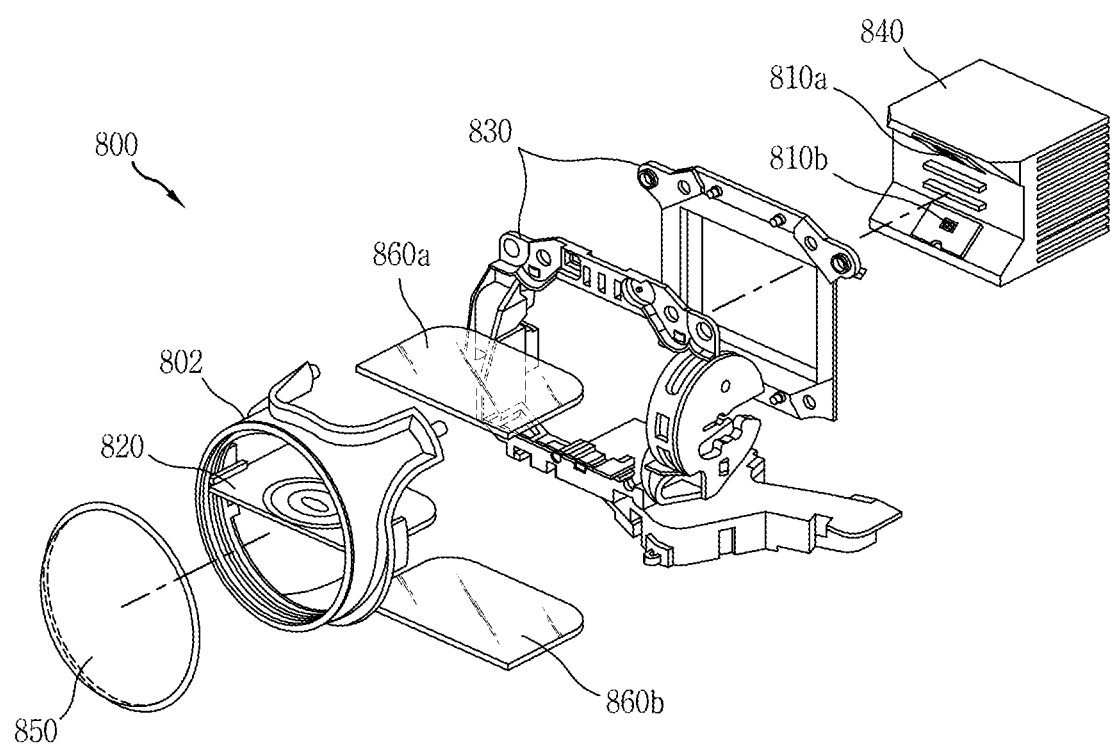
FIGS. 11A, 11B, and 11C are diagrams illustrating examples of an exploded perspective view, a side view, and a cross-sectional view of a vehicle lamp further including a light-transmissive shield according to an implementation of the present disclosure.
Figure 11B:
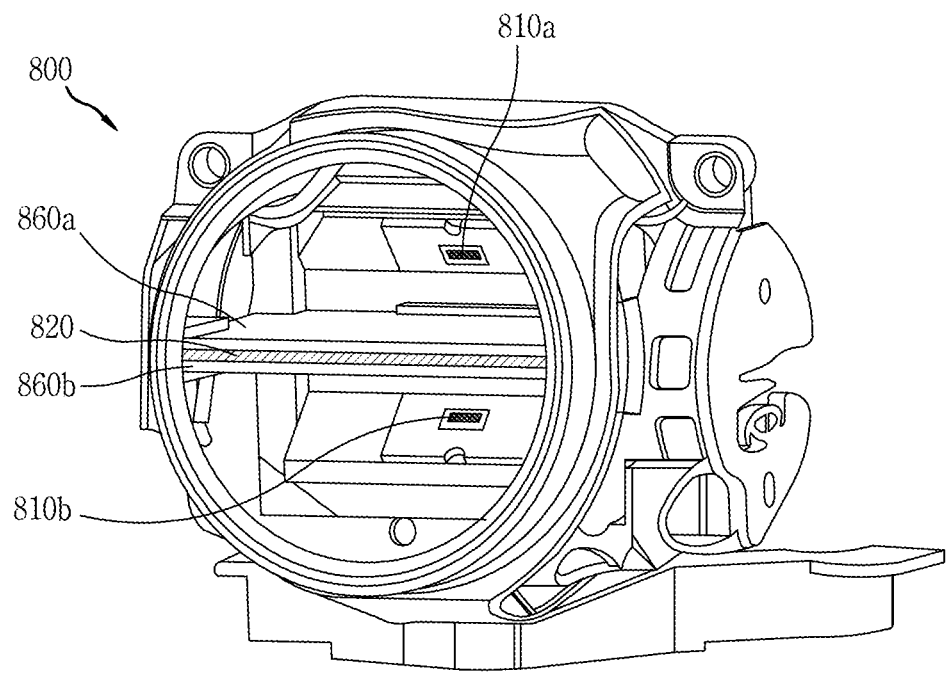
Figure 11C:
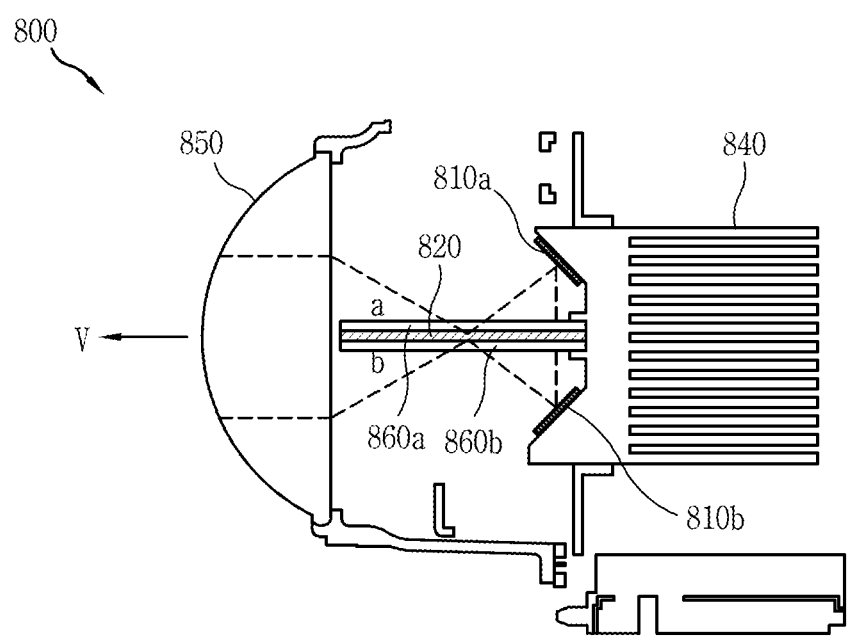

FIGS. 11A, 11B, and 11C are an exploded perspective view, a side view, and a cross-sectional view of a vehicle lamp further including a light-transmissive shield according to an implementation of the present disclosure.

The vehicle lamp 800 may further include a light-transmissive shield 860.

The light-transmissive shield 860 may be disposed to overlap one surface 820*a* of the reflector 820 between the reflector 820 and the light source unit 810 and may be formed of a material allowing light to transmit therethrough. Light generated by the light source unit 810 passes through the light-transmissive shield 860 to reach the reflector 820, and light reflected by the reflector 820 passes back through the light-transmissive shield 860 to reach the lens 850.

In some implementations, at least a portion of the light-transmissive shield 860 may also be configured to vary light transmittance thereof. For example, in scenarios in which light generated by the light source unit 810 is to be output as at least one of a plurality of light distribution patterns, the processor 870 controls the light-transmissive shield 860 such that light transmittance of the light-transmissive shield 860 is varied according to the at least one light distribution pattern. In such implementations, the processor 870 may select any one of the plurality of light distribution patterns and control the light-transmissive shield 860 to have an appropriate light transmittance varied according to the selected light distribution pattern.

In some implementations, the light-transmissive shield 860 may include a first shield part having a first light transmittance and a second shield part having a second light transmittance. A position and a size of at least one of the first shield part or the second shield part of the light-transmissive shield 860 may be varied according to the any one light distribution pattern. As such, the light-transmissive shield 860 may have different light transmittance according to different shield parts.

In some implementations, the light-transmissive shield 860 may be implemented to have a plurality of pixels having a predetermined size to enable partial controlling, and light transmittance of each pixel may be individually controlled. For example, the pixels may be arranged in a matrix form on the light-transmissive shield 860.

The light-transmissive shield 860 may employ any type of components (material or technique) available for changing light transmittance. For example, the light-transmissive shield 860 may be formed as a liquid crystal (LC) film, a liquid crystal display (LCD), a stretch film, an ITO film, and the like, varied in light transmittance according to strength of an electrical signal (e.g., a current, a voltage, or power).

The light-transmissive shield 860 may be termed a matrix shield, a display shield, or a variable shield.

The light-transmissive shield 860 may be formed such that light transmitted is independently controlled by pixels. The processor 870 may control the light-transmissive shield 860 to form a predetermined light distribution pattern by adjusting light transmittance of each pixel differently.

Each pixel may be formed such that light transmittance is partially varied. Here, a certain pixel may include a first pixel portion having first light transmittance and a second pixel portion having second light transmittance.

The processor 870 may control light transmittance of at least some of a plurality of pixels included in the light-transmissive shield 860 such that a partial amount of light generated by the light source unit 810 is shielded (blocked) by some of the pixels.

In some implementations, the processor 870 may generate any one of a plurality of light distribution patterns by adjusting the light transmittance of the light-transmissive shield 860. For example, the processor 870 may adjust the light transmittance of the light-transmissive shield 860 such that a light distribution pattern is generated with a boundary line or a cut-off line that has a gradation across the boundary line or cut-off line. For example, the processor 870 may control the light-transmissive shield 860 such that a pixel corresponding to a first side of the boundary line on the light distribution pattern has a first light transmittance, a pixel corresponding to the boundary line has a second light transmittance less than the first light transmittance, and a pixel corresponding to a second side of the boundary line on the light distribution pattern has a third light transmittance less than the second light transmittance.

As such, the processor 870 may adaptively and selectively control the light transmittance of at least some of the plurality of pixels, the present disclosure may provide the vehicle lamp configured to irradiate light in various beam patterns.

In some implementations, the light-transmissive shield 860 may include at least one of a first light-transmissive shield 860a and a second light-transmissive shield 860b.

The first light-transmissive shield 860a may be disposed on one surface 820a of the reflector 820 to overlap at least a portion of the high beam reflective part 822 such that at least a partial amount of first light generated by the first light source part 810a reaches the overlapped high beam reflective part 822.

The processor 870 may adjust light transmittance of the first light-transmissive shield 860a to form any one of a plurality of high beam light distribution patterns.

In some implementations, the second light-transmissive shield 860b is disposed on the other surface 820b of the reflector 820 to overlap at least a portion of the low beam reflective part 826 such that at least a partial amount of second light generated by the second light source part 810b reaches the overlapped low beam reflective part 826.

The processor 870 may adjust light transmittance of the second light-transmissive shield 860b to form any one of a plurality of low beam light distribution patterns.

As illustrated in FIGS. 11B and 11C, the first light-transmissive shield 860a may be disposed on one surface 820a of the reflector 820 and the second light-transmissive shield 860b may be disposed on the other surface 820b of the reflector 820.

According to this structure, a structure of the vehicle lamp 800 may be simplified and a size of the vehicle lamp 800 may be reduced.

Hereinafter, a method of generating various high beam light distribution patterns and/or low beam light distribution patterns using a light-transmissive shield will be described in detail.

First, a method of generating a high beam light distribution pattern using the first light-transmissive shield 860a will be described.

Figure 12:
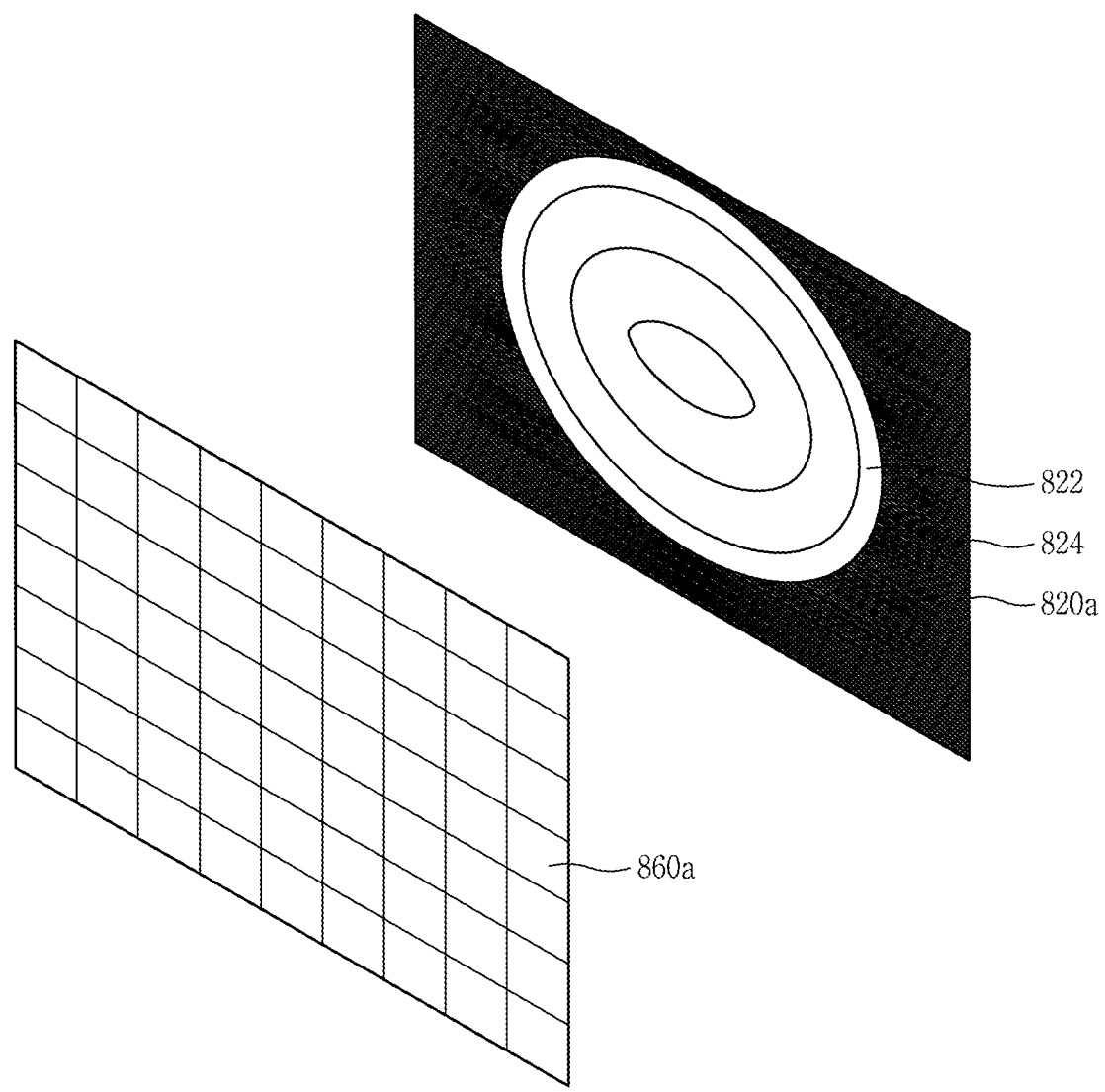
FIG. 12 is a diagram illustrating an example of a first light-transmissive shield configured to generate a high beam light distribution pattern.

FIG. 12 is a diagram illustrating an example of a first light-transmissive shield configured to generate a high beam light distribution pattern, and FIGS. 13A to 13E are diagrams illustrating examples of generating various high beam light distribution patterns using the first light-transmissive shield of FIG. 12.

Referring to FIG. 12, the first light-transmissive shield 860a may be disposed on one surface 820a of the reflector 820 having the high beam reflective part 822 and the high beam non-reflective part 824. Since the first light-transmissive shield 860a is disposed in an optical path of the first light source part 810a, first light generated by the first light source part 810a reaches the one surface 820a of the reflector 820 through the first light-transmissive shield 860a.

When every part of the first light-transmissive shield 860a has light transmittance of 100%, the first light as is reaches the high beam reflective part 822 and the high beam non-reflective part 824 through the first light-transmissive shield 860a. Thus, the first light forms a basic high beam light distribution pattern by the high beam reflective part 822 and the high beam non-reflective part 824.

When every part of the first light-transmissive shield 860a has light transmittance of 50%, a high beam light distribution pattern which has the same shape as that of the basic high beam light distribution pattern but has brightness reduced to 50% is formed.

In addition, since different parts of the first light-transmissive shield 860a have different light transmittance to each other, at least one of a size and brightness of a high beam light distribution pattern is varied.

For example, when another vehicle (e.g., an approaching vehicle) driving in a direction opposite to a direction in which the vehicle 100 is driving is sensed, the processor 870 may control light transmittance of the first light-transmissive shield 860a such that light may not be irradiated to the other vehicle.

Figure 13A:
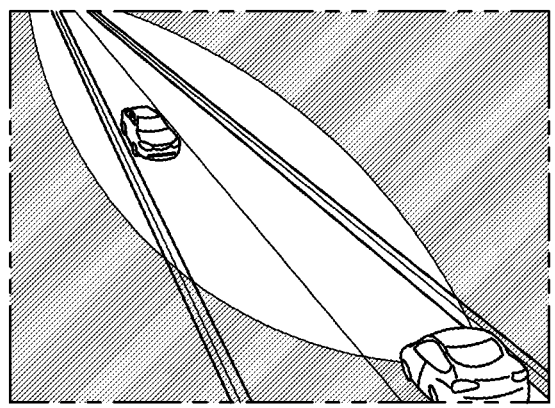
FIGS. 13A to 13E are diagrams illustrating examples of generating various high beam light distribution patterns using the first light-transmissive shield of FIG. 12.
Figure 13B:
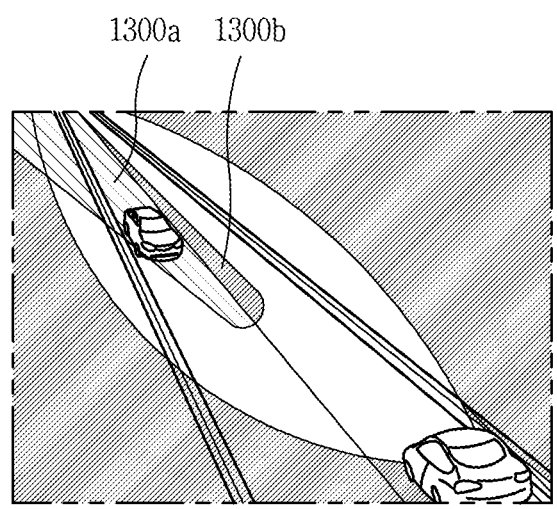
Figure 13B:
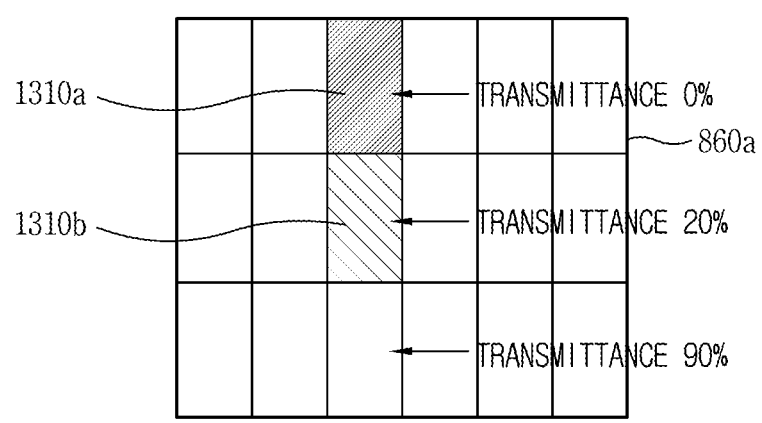

As illustrated in FIG. 13A, in a state in which light transmittance of the first light-transmissive shield 860a is set to output the basic high beam light distribution pattern, a sensing signal corresponding to the other vehicle driving in the opposite direction may be transmitted through a communication unit. Here, as illustrated in FIG. 13B, the processor 870 may control light transmittance of at least one of pixels 1310a and 1310b of the light-transmissive shield 860 to block light traveling to regions 1300a and 1300b in which light is irradiated to the other vehicle.

In order to block light irradiated to a first space in which a driver of the other vehicle is positioned, the processor 870 may set light transmittance of the pixel 1310b through which light irradiated to the first space passes, among the pixels of the light-transmissive shield 860, to 0%. As such, in some implementations, by varying the light transmittance of the corresponding pixel to 0%, light of the corresponding portion may be controlled not to reach the reflector 820.

In addition, in order to reduce an amount (or brightness) of light irradiated to a second space corresponding to a peripheral region of the other vehicle, the processor 870 may set light transmittance of the pixel 1310*a* through which light irradiated to the second space passes, among the pixels of the light-transmissive shield 860, to preset light transmittance (e.g., 20%).

Through this configuration, the vehicle lamp of the present disclosure may implement an antiglare high-beam assistance function of preventing irradiation of light to the opposite side vehicle.

Figure 13C:
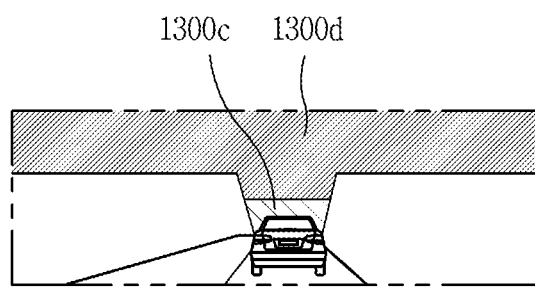
Figure 13C:
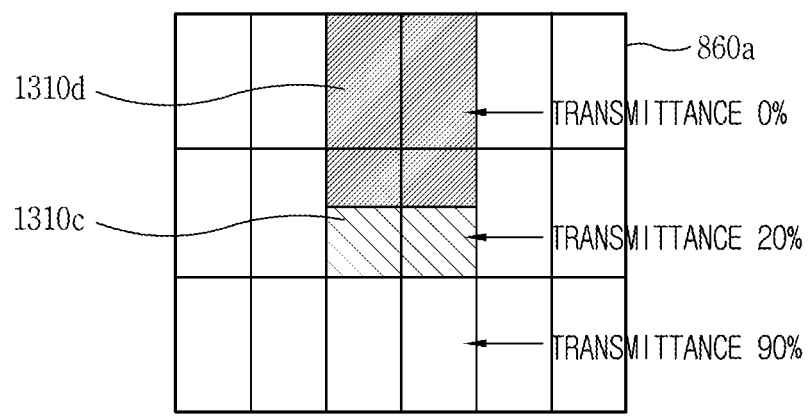

In some implementations, as illustrated in FIG. 13C, the processor 870 may control the first light-transmissive shield 860*a* such that light is irradiated to a space 1300*d* including both sides of the vehicle 100 and a predetermined height and light is not irradiated to a space 1300*c* other than the space 1300*d*. In detail, the processor 870 may select a portion 1310*c* of the space 1300*c* corresponding to pixels of the first light-transmissive shield 860*a*, and set light transmittance of the selected portion 1310*c* to 0%. Also, in order to generate a natural light spreading effect, the processor 870 may set light transmittance of at least one pixel 1310*d* positioned in an edge region of the selected portion 1310*c* to a preset transmittance (e.g., 20%).

Figure 13D:
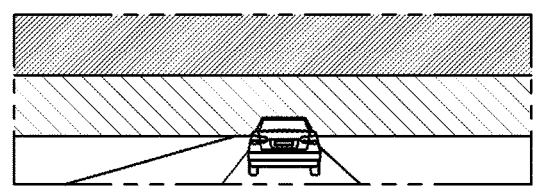
Figure 13D:
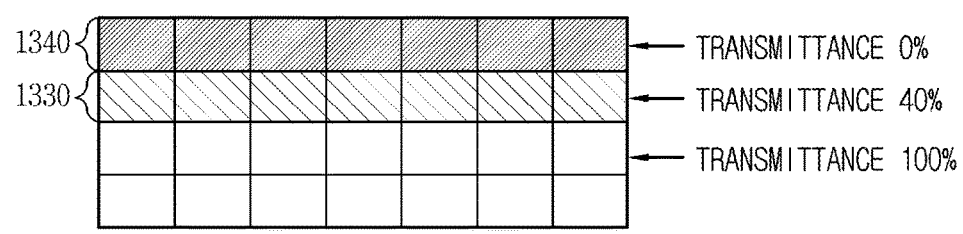
Figure 13E:
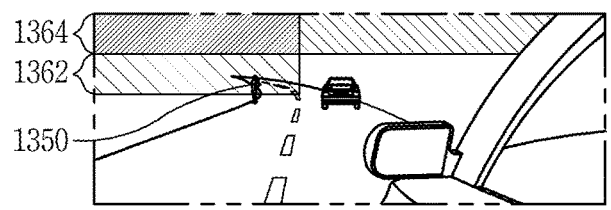
Figure 13E:
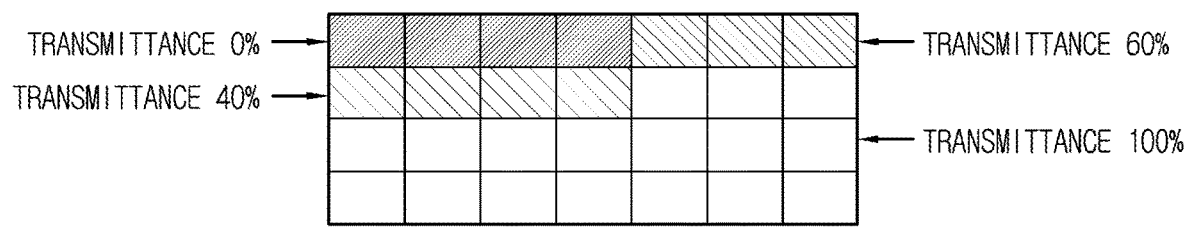

In some implementations, as illustrated in FIG. 13D, the processor 870 may uniformly maintain light transmittance of the pixels of the first light-transmissive shield 860*a* in a general driving mode. In order to prevent a high beam from reaching a driver of another vehicle, the processor 870 may block at least a partial amount of light generated by the first light source part 810*a*, and in order to provide a gradation effect of a high beam light distribution pattern, the processor 870 may control light transmittance of first and second groups 1330 and 1340 of the first light-transmissive shield 860*a*. For example, the processor 870 may set light transmittance of pixels belonging to the first group 1330 to 40% and light transmittance of pixels belonging to the second group 1340 to 0%.

In this state, when a specific object (e.g., a person) is sensed within a predetermined distance from the vehicle 100, the processor 870 may change light transmittance of the first light-transmissive shield 860*a* such that light may be irradiated to spaces 1362 and 1364 where the specific object 1350 is present.

For example, when the specific object is sensed, the processor 870 may change light transmittance of a pixel through which light irradiated to the portion 1362 of the space passes, among the pixels belonging to the first group 1330. Light transmittance of the corresponding pixel may be changed from 40% to 100% and a large amount of light may be irradiated to the portion 1362 of the space. Here, the portion 1362 of the space may be a space directly including the sensed object.

Also, when the specific object 1350 is sensed, the processor 870 may change light transmittance of a pixel through which light irradiated to another portion 1364 of the space passes, among the pixels belonging to the second group 1340. Since light transmittance of the corresponding pixel is changed from 0% to 60%, an amount of light smaller than that of the portion 1362 may be irradiated to the other portion 1364 of the space. The other portion 1364 of the space may be a peripheral space of the sensed object.

Through this configuration, when an object is sensed, the vehicle lamp 800 of the present disclosure may output a corresponding high beam light distribution pattern in an improved manner and also implement a more precise high beam light distribution pattern output by adjusting an amount of light irradiated to a peripheral space, in addition to a space in which the sensed object is directly present.

In this manner, the vehicle lamp 800 according to an implementation of the present disclosure may generate the basic high beam light distribution pattern using one surface of the reflector 820 including the reflective part and the non-reflective part, and change the basic high beam light distribution pattern using the first light-transmissive shield 860*a* which can be adjusted in light transmittance. Since the one surface 820*a* of the reflector 820 and the first light-transmissive shield 860*a* are disposed to overlap each other, a structure of the vehicle lamp may be simplified and a size of the vehicle lamp may be reduced, obtaining a novel effect.

Hereinafter, a method of generating a low beam light distribution pattern using the second light-transmissive shield 860*b* will be described.

Figure 14:
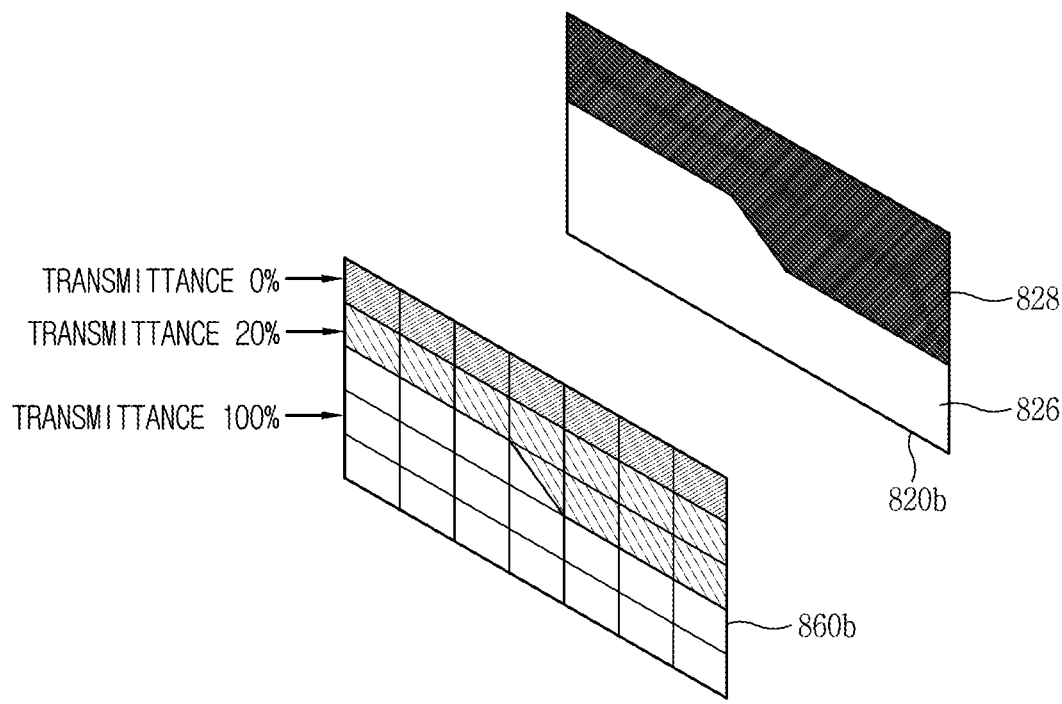
FIG. 14 is a diagram illustrating an example in which a second light-transmissive shield configured to generate a low beam light distribution pattern is provided on the other surface of a reflector including a non-reflective part.

FIG. 14 is a diagram illustrating an example in which a second light-transmissive shield configured to generate a low beam light distribution pattern is provided on the other surface of a reflector including a non-reflective part.

As illustrated in FIG. 14, the other surface 820*b* of the reflector 820 may include the low beam reflective part 826 and the low beam non-reflective part 828. Here, second light generated by the second light source part 810*b* generates a basic low beam light distribution pattern by the low beam reflective part 826 and the low beam non-reflective part 828. A boundary line between the low beam reflective part 826 and the low beam non-reflective part 828 forms a cut-off line CL of the low beam light distribution pattern.

The second light-transmissive shield 860*b* which can be adjusted in light transmittance may be disposed on the other surface 820*b* of the reflector 820 in an overlapping manner.

The processor 870 may generate any one of a plurality of low beam light distribution patterns by adjusting light transmittance of the second light-transmissive shield 860*b*.

Here, the processor 870 may adjust light transmittance of the second light-transmissive shield 860*b* such that a cut-off line based on the any one low beam light distribution pattern has gradation.

Here, second light generated by the second light source part 810*b* is changed to the basic low beam light distribution pattern by the other surface 820*b* of the reflector 820 and a gradation effect is produced in the cut-off line of the basic low beam light distribution pattern by the second light-transmissive shield 860*b*.

The cut-off line may move vertically or horizontally due to movement of a vehicle body based on non-uniformity of a road surface. Here, in a state in which a high beam is not output, even only the low beam may cause glaring to a driver of another vehicle. This problem, however, may be solved because the vehicle lamp according to an implementation of the present disclosure provides a gradation effect to the boundary of the cut-off line.

The processor 870 may change at least one of a size, brightness, a shape, and gradation of the low beam light distribution pattern by adjusting light transmittance of the second light-transmissive shield 860*b* corresponding to the low beam reflective part 826 with respect to pixels.

In some implementations, the reflector 820 may also generate a unique light distribution pattern only by the light-transmissive shield, without having a non-reflective part.

Figure 15:
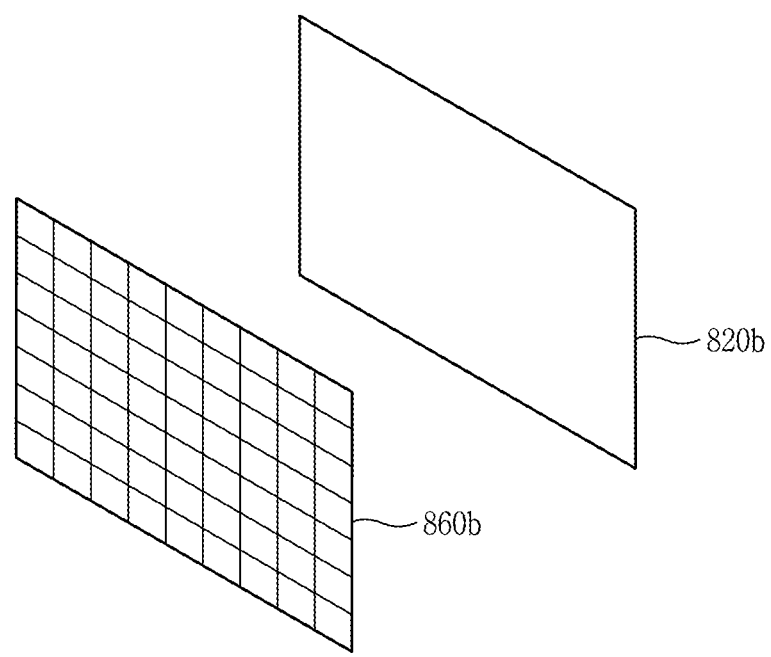
FIG. 15 is a diagram illustrating an example in which a second light-transmissive shield configured to generate a low beam light distribution pattern is provided on the other surface of a reflector not including a non-reflective part.

FIG. 15 is a diagram illustrating an example in which a second light-transmissive shield configured to generate a low beam light distribution pattern is provided on the other surface of a reflector not including a non-reflective part.

The other surface 820b of the reflector 820 may have only a reflective part, without a non-reflective part. Also, the second light-transmissive shield 860b may be disposed on the other surface 820b of the reflector 820 in an overlapping manner.

Since the other surface 820b of the reflector 820 does not have a non-reflective part, the reflector 820 does not perform a function of a shield with respect to a low beam. Here, a low beam light distribution pattern may be formed by the second light-transmissive shield 860b, and various low beam light distribution patterns may be formed according to light transmittance of the second light-transmissive shield 860b.

FIGS. 16A to 16J are diagrams illustrating examples of generating various low beam light distribution patterns using the second light transmissive shield illustrated in FIG. 14 and/or FIG. 15.

When the vehicle lamp 800 outputs a low beam, a predetermined cut-off line should be generated according to a rule.

For example, the cut-off line may be defined as a boundary line generated on an upper side in a region to which light is irradiated, when light is irradiated to a plane (e.g., a wall surface) spaced apart from the vehicle lamp 800 by a predetermined distance.

The cut-off line may refer to a boundary line where brightness of light is equal to or greater than a reference value when light is irradiated to the plane.

Figure 16A:
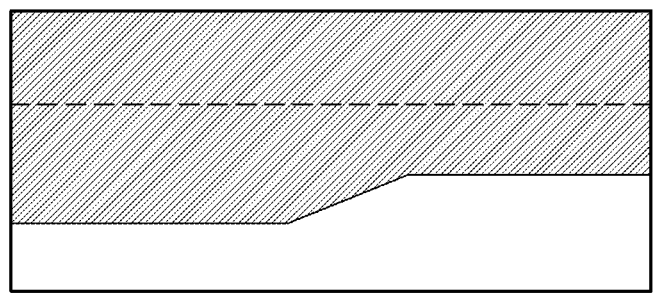
FIGS. 16A to 16J are diagrams illustrating examples of generating various low beam light distribution patterns using the second light transmissive shield illustrated in FIG. 14 and/or FIG. 15.
Figure 16A:
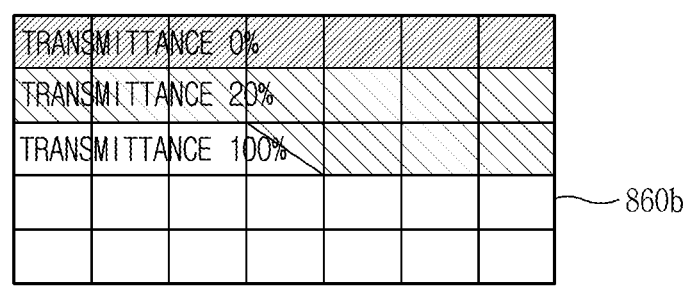
Figure 16B:
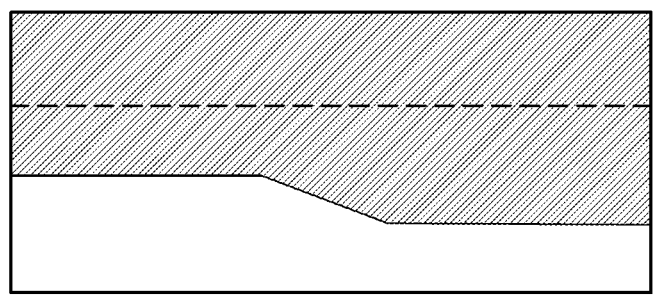
Figure 16B:
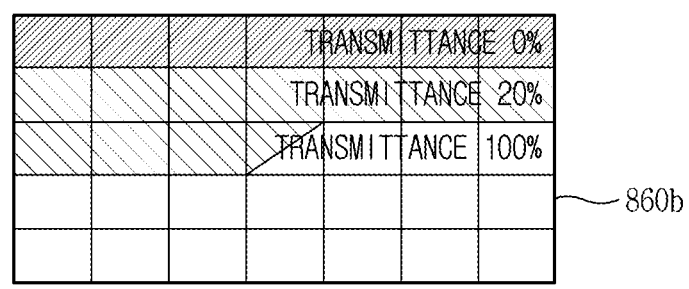

As illustrated in FIGS. 16A and 16B, a shape of the cut-off line may be defined to be different according to a rule (or a country, an area, a state, a city, etc.).

For example, in the case of a country (area, state, etc.) in which a vehicle is designated to keep to the right, a cut-off line in which the left side is lower than the right side as illustrated in FIG. 16A should be generated. In another example, in the case of a country in which a vehicle is designated to keep to the left, a cut-off line in which the right side is lower than the left side as illustrated in FIG. 16 should be generated.

This is to prevent a driver of another vehicle from being glared by minimizing irradiation of light to the other vehicle driving on the opposite side (or in the opposite direction).

The processor 870 may determine a current location of the vehicle 100 having the vehicle lamp 800 on the basis of information received from the location information unit 420. Also, the processor 870 may control light transmittance of a plurality of pixels included in the second light-transmissive shield 860b such that a low beam pattern corresponding to the rule applied to the corresponding country (or area or state) is irradiated on the basis of the current location.

As illustrated in FIGS. 16A and 16B, the processor 870 may control some of the plurality of pixels of the second light-transmissive shield 860b not to allow light to transmit therethrough (for example, control light transmittance to 0%) such that light is irradiated (output, generated, or transmitted) to generate a low beam pattern.

In detail, when light transmittance of some of the plurality of pixels is controlled (to 0%) not to allow light to transmit therethrough, light traveling toward the portion where light transmittance has been set to 0, among light generated by the second light source part 810b, is blocked by the second light-transmissive shield 860b and cannot travel to the other surface 820b of the reflector 820, and thus, it cannot travel toward the lens 850.

Thus, only light traveling toward a portion where light transmittance is not 0%, among light generated by the second light source part 810b, may pass through the second light-transmissive shield 860b and may be irradiated to the other surface 820b of the reflector 820 so as to be reflected to the lens 850. Also, the light irradiated to the lens 850 passes through the lens 850 so as to be irradiated to the outside to generate a predetermined beam pattern (e.g., a low beam pattern or a cut-off line).

In some implementations, the light-transmissive shield 860 of the vehicle lamp 800 may be formed (controlled) such that each of the plurality of pixels allows only a partial amount of light received from the light source unit 810 to pass therethrough For example, each pixel may be controlled in light transmittance such that only a partial amount of received light passes therethrough. For example, it is assumed that light corresponding to 100 is received by a specific pixel. When light transmittance of the specific pixel is set (controlled) to 50%, the specific pixel may allow only an amount of light corresponding to 50, among the light corresponding to 100, to transmit therethrough. Accordingly, brightness of light passing through the corresponding pixel is reduced (in other words, brightness of a portion of the beam pattern generated by light which has passed through the corresponding pixel may be dark).

In this manner, the processor 870 may generate (irradiate) various patterns of light by independently controlling light transmittance of the plurality of pixels included in the light-transmissive shield 860.

For example, as illustrated in FIGS. 16A and 16B, light transmittance of pixels included in a first portion, among the plurality of pixels, may be set to 50%, light transmittance of pixels included in a second portion different to the first portion may be set to 20%, and light transmittance of pixels included in a third portion different to the first and second portions may be set to 0%, and in this state, a beam pattern having a gradation effect may be output (irradiated or generated).

As such, in some implementations, by setting light transmittance of the plurality of pixels included in the light-transmissive shield 860 to be gradually increased in one direction (e.g., in an upward direction), a gradation effect (e.g., an effect of gradually brightening or darkening in a predetermined direction) may be implemented in a beam pattern irradiated to a front side of the vehicle lamp 800.

In some implementations, the processor 870 of the present disclosure may control the light-transmissive shield 860 to output light of various beam patterns according to situations by independently controlling light transmittance of the plurality of pixels included in the light-transmissive shield 860.

In detail, the processor 870 may receive information sensed by the sensing unit 120 provided in the vehicle through a communication unit. The information related to the vehicle may be at least one of vehicle information (or driving state of the vehicle) and surrounding information of the vehicle.

For example, the vehicle information may include a driving speed of a vehicle, a weight of the vehicle, the number of occupants of the vehicle, braking power of the vehicle, maximum braking power of the vehicle, a driving mode of the vehicle (whether it is an autonomous driving mode or a manual driving mode), a parking mode of the vehicle (autonomous parking mode, automatic parking mode, or a manual parking mode), whether the user is present in the vehicle and information related to the user (e.g., whether the user is an authenticated user or not), and the like.

The surrounding information of the vehicle may include, for example, a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information (or surrounding environmental information) of the vehicle may include external information of the vehicle (e.g., peripheral brightness, temperature, location of the sun, information of a peripheral subject (person, another vehicle, a sign, etc.), a type of a road surface on which the vehicle is driving, a geographic feature, line information, or lane information), and information required for autonomous driving/autonomous parking/automatic parking/manual parking mode.

Also, the surrounding information of the vehicle may further include a distance between an object present in the vicinity of the vehicle 100 and the vehicle 100, a type of the object, a parking space in which the vehicle may park, an object (e.g., a parking line, a string, another vehicle, a wall, etc.) for identifying the parking space, and the like.

Also, the information related to the vehicle may include various operation modes set by a user input.

Figure 16C:
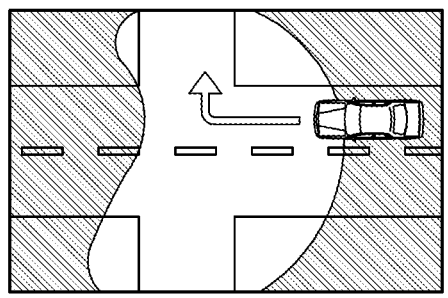
Figure 16C:
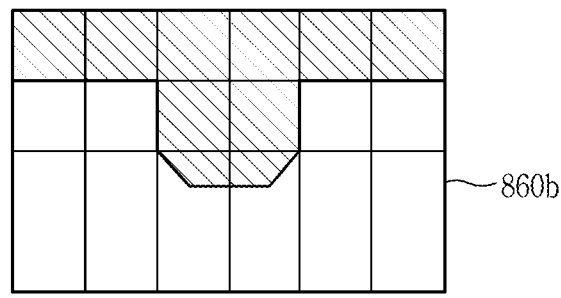

For example, as illustrated in FIG. 16C, when a preset first condition is met (for example, it is sensed by the sensing unit 120 that the vehicle is driving in a lane adjacent to a sidewalk or a pedestrian mode is set by the user), the processor 870 may control pixels of a portion associated with the first condition, among the plurality of pixels of the light-transmissive shield 860, not to allow light to pass therethrough, in order to output light corresponding to a first beam pattern corresponding to the first condition, among the plurality of pixels.

Figure 16D:
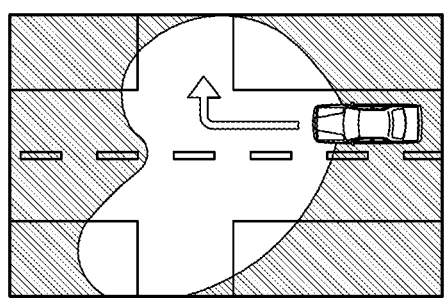
Figure 16D:
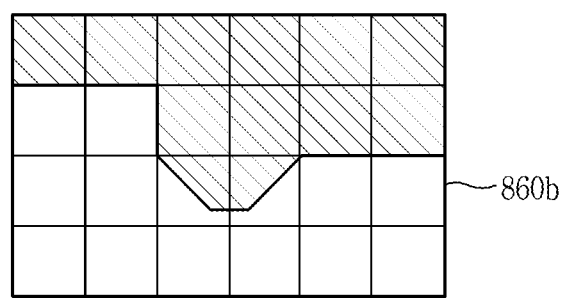

In another example, as illustrated in FIG. 16D, when a second condition different to the first condition is met (for example, when it is sensed that a current location of the vehicle 100 is an area corresponding to downtown), the processor 870 may control pixels of a portion associated with the second condition, among the plurality of pixels of the light-transmissive shield 860, not to allow light to pass therethrough. In order to output light corresponding to a second beam pattern (different to the first beam pattern) corresponding to the second condition, among the plurality of pixels.

Figure 16E:
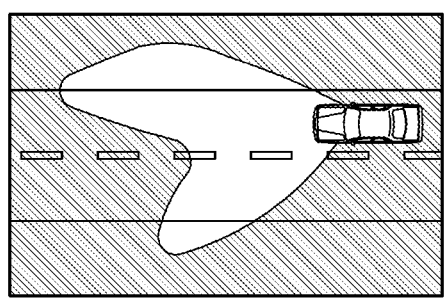
Figure 16E:
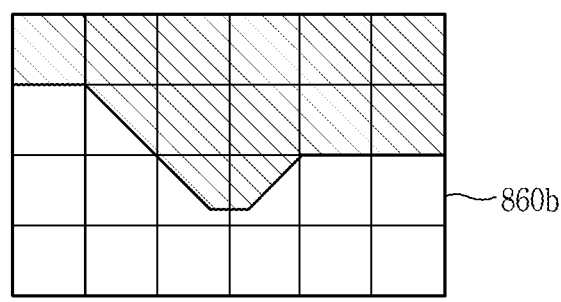
Figure 16F:
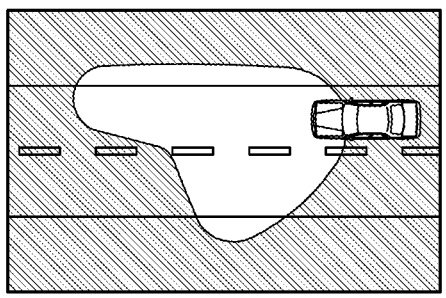
Figure 16F:
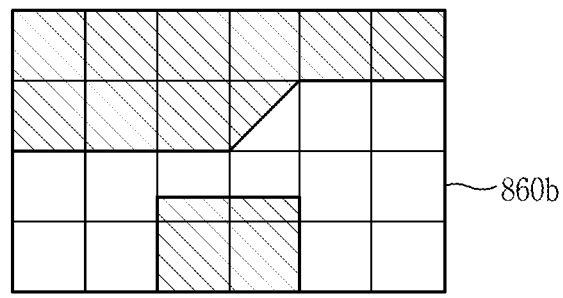
Figure 16G:
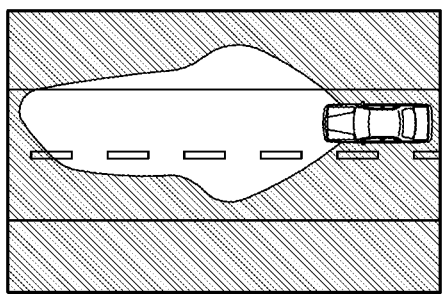
Figure 16G:
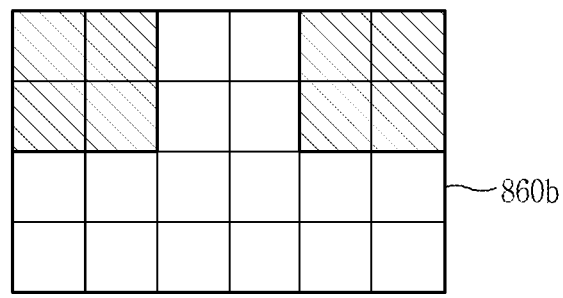
Figure 16H:
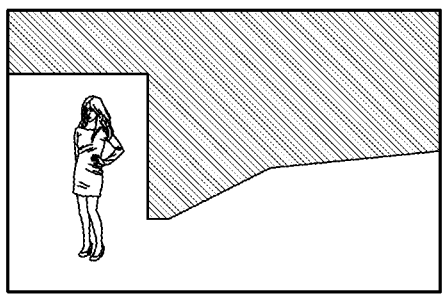
Figure 16H:
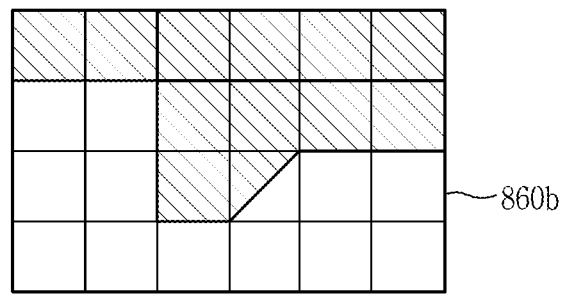

FIG. 16C illustrates a beam pattern and light transmittance of the second light-transmissive shield 860b when the pedestrian mode is set, FIG. 16D illustrates a beam pattern and light transmittance of the second light-transmissive shield 860b when a town mode is set, FIG. 16E illustrates a beam pattern and light transmittance of the second light-transmissive shield 860b when a country mode is set, FIG. 16F illustrates a beam pattern and light transmittance of the second light-transmissive shield 860b when a light output mode (or an adverse weather mode) is set in specific weather (e.g., snow, rain, etc.), FIG. 16G illustrates a beam pattern and light transmittance of the second light-transmissive shield 860b when a motorway mode is set, and FIG. 16H illustrates a beam pattern and light transmittance of the second light-transmissive shield 860b when an object tracking mode (or an AFS+detecting mode) for irradiating light to a specific object is set. As illustrated in FIGS. 16A to 16H, the processor 870 may control the second light-transmissive shield 860b such that portions not allowing light to pass therethrough are varied in the second light-transmissive shield 860b.

Also, the vehicle lamp 800 of the present disclosure may receive information sensed by the sensing unit 120 which senses information related to the vehicle, through a communication unit.

When the sensed information related to the vehicle meets (or satisfies) a preset condition, the processor 870 may set light transmittance of a predetermined region to the preset transmittance.

In detail, when the sensed information related to the vehicle corresponds to the preset first condition, the processor 870 may set the adjacent region to have first light transmittance (e.g., 80%). Also, when the sensed information related to the vehicle corresponds to a preset second condition different to the first condition, the processor 870 may set light transmittance of the adjacent region to second light transmittance (e.g., 60%) different to the first light transmittance.

For example, the preset first condition may include a situation in which a boundary of a cut-off line of a low beam pattern is required to be changed to be a bit faint. For example, the preset first condition may include a case in which peripheral brightness of the vehicle lamp 800 is greater than reference brightness, a case in which the vehicle 100 is running on a specific road (e.g., an expressway), a case in which another vehicle is driving in the opposite direction within a predetermined distance from the vehicle 100, or a case in which the vehicle 100 is running on a downhill road.

In another example, the preset second condition may include a situation in which a boundary of a cut-off line of a low beam pattern is required to be changed to be more faint. For example, the preset second condition may include a case in which peripheral brightness of the vehicle lamp 800 is less than the reference brightness, a case in which the vehicle 100 is driving on a specific type of road (e.g., a dirt road, a one-way road, etc.), a case in which another vehicle driving in the opposite direction within a predetermined distance from the vehicle 100 is not present), or a case in which the vehicle is running on an uphill road.

The examples enumerated in the above are merely illustrative and the present disclosure is not limited thereto and the first and second conditions may include various conditions. Also, the first and second conditions may be determined or changed by a user setting.

In some implementations, when information related to the vehicle satisfying the preset conditions (first and second conditions) is not sensed by the sensing unit 120, the processor 870 may restore light transmittance of the adjacent region to the original state.

For example, before satisfying the preset conditions, light transmittance of pixels included in a region adjacent to the portion allowing the passage of light, in a portion not allowing the passage of light, may have a first value (e.g., 0%). In this state, when information related to the vehicle satisfying the preset condition is sensed, the light transmittance of the adjacent region may be changed to a second value (e.g., 50%) different to the first value under the control of the controller 870.

Thereafter, when information related to the vehicle satisfying the preset condition is not sensed (or when the state related to the vehicle satisfying the preset condition is released), the processor 870 may change the light transmittance of the adjacent region from the second value to the first value.

On the basis of information related to the vehicle sensed through the sensing unit 120, the processor 870 of the vehicle lamp 800 related to the present disclosure may set portions not allowing the passage of light, among the plurality of pixels of the light-transmissive shield 860, to be different such that cut-off lines may be generated in different positions with respect to the vehicle.

In detail, when the sensed information related to the vehicle satisfies the preset first condition, the processor 870 may change light transmittance of a first portion among the plurality of pixels, in order not to allow the passage of light.

Also, when the sensed information related to the vehicle satisfies the preset second condition different to the first condition, the processor 870 may change light transmittance of a second portion different to the first portion, in order to allow the passage of light.

Figure 16I:
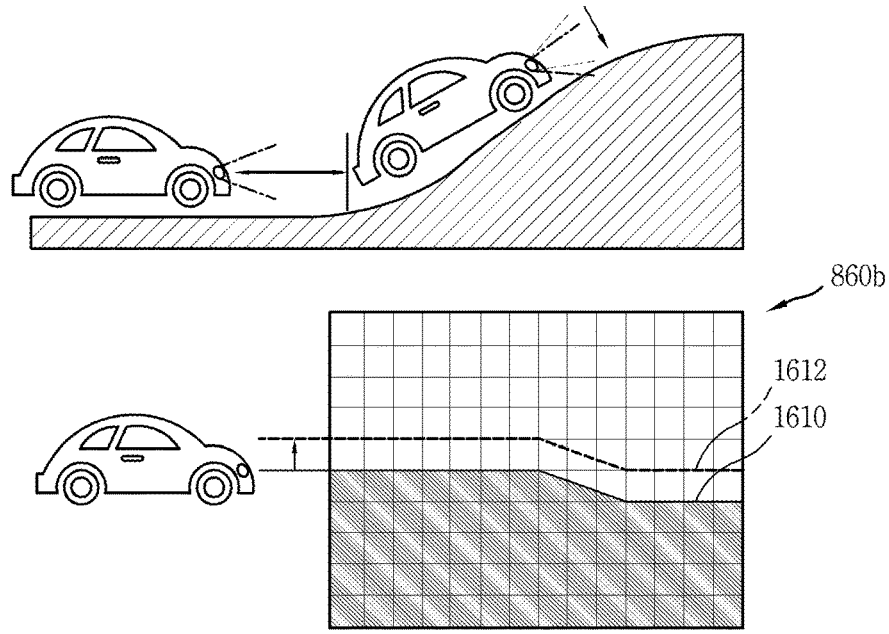

For example, as illustrated in FIG. 16I, the preset first condition may include a case in which the vehicle enters an uphill road (or a case in which a front side of a vehicle body of the vehicle is tilted upwards). Here, the vehicle lamp 800 of the present disclosure may change light transmittance of a first portion among the plurality of pixels of the second light-transmissive shield 860*b* in order not to allow the passage of light, so that a beam pattern irradiated to a front side of the vehicle is irradiated in a downward direction with respect to the vehicle (e.g., a cut-off line of the beam pattern is lowered). As such, in some implementations, the processor 870 may change light transmittance of the first portion formed to allow the passage of light among the plurality of pixels, such that light is does not pass therethrough on the basis of the sensed preset first condition.

For example, when the vehicle is generally driving, the processor 870 may control light transmittance of the plurality of pixels such that the cutoff line is present in a first position 1610

Thereafter, when the preset first condition is sensed through the sensing unit 120, the processor 870 may determine to lower the cut-off line of the beam pattern output to the front side. As such, this may provide an improved beam pattern to the driver by adjusting a light irradiation direction to a downward direction on the uphill road.

To this end, the processor 870 may control light transmittance of the first portion such that the first portion of the plurality of pixels of the second light-transmissive shield 860*b* (specifically, the region adjacent to the region controlled not to allow the passage of light, among regions of the plurality of pixels adjusted to allow the passage of light) does not allow the passage of light, so that the cut-off line of the beam pattern is lowered in a downward direction.

Figure 16J:
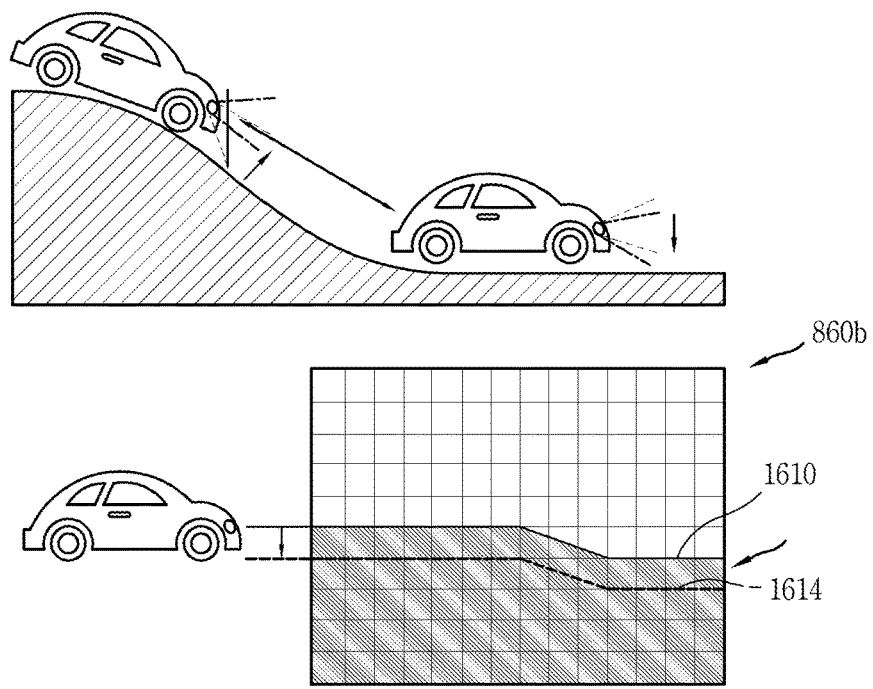

Conversely, as illustrated in FIG. 16J, the preset second condition may include a case in which the vehicle enters a downhill road (or a case in which the front side of the vehicle body of the vehicle is tilted downwards). Here, the vehicle lamp 800 of the present disclosure may change light transmittance of the second portion among the plurality of pixels of the second light-transmissive shield 860*b* to allow the passage of light, so that a beam pattern irradiated to the front side of the vehicle is irradiated in an upward direction with respect to the vehicle 100 (e.g., a cut-off line of the beam pattern is raised). As such, in some implementations, based on the satisfied preset second condition, the controller 870 may control light transmittance of the second portion, which has been set not to allow the passage of light, to allow passage of light.

Thereafter, when the preset first condition or second condition is not sensed (or released), the processor 870 may control light transmittance of the plurality of pixels such that the cut-off line is restored to the original position 1610.

Through this configuration, the present disclosure may provide the vehicle lamp configured to change a position of a cut-off line in an improved manner.

In the present disclosure, a low beam pattern may be formed using the second light-transmissive shield 860 which includes a plurality of pixels in a matrix form and individually controls light transmittance independently, even without a shield mechanically operated such as rotated to generate a cut-off line. In addition, in the present disclosure, a smart lamp may be implemented by generating a beam pattern that is adaptively optimized according to a situation by controlling light transmittance of the plurality of pixels included in the second light-transmissive shield 860*b*.

Also, one or more or every function performed by the processor 870 provided in the vehicle lamp 800, components, and the control method thereof may be performed by the controller 170 provided in the vehicle 100. As such, in some implementations, one or more or every control method described in this disclosure may be applied to a control method of a vehicle and may also be applied to a control method of a control device.

The aforementioned present disclosure may be implemented as computer-readable codes (or applications or software). The control method of the autonomous driving vehicle described above may be realized by codes stored in a memory, or the like.

The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing implementations and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle lamp comprising:
   a light source unit comprising one or more light sources and that is configured to generate light;
   a reflector configured to reflect at least part of the light that is generated by the light source unit; and
   a lens configured to transmit therethrough a first portion of the light that is generated by the light source unit and that is reflected by the reflector to the lens,
   wherein the reflector comprises:
      a reflective part that is configured to reflect, to the lens, the first portion of the light that is generated by the light source unit; and
      a non-reflective part that is configured not to reflect, to the lens, the light that is generated by the light source unit,
      wherein the reflective part and the non-reflective part of the reflector are configured to selectively reflect the light that is generated by the light source unit towards the lens to output a light distribution pattern from the vehicle lamp,
   wherein the light source unit comprises a first light source part and a second light source part that are oriented to output light in different directions towards the reflector, and
   wherein the reflector comprises:
      a first surface configured to reflect first light generated by the first light source part of the light source unit; and
      a second surface configured to reflect second light generated by the second light source part of the light source unit.

2. The vehicle lamp of claim 1, wherein the first surface and the second surface of the reflector are arranged to face opposite directions.

3. The vehicle lamp of claim 2, wherein the reflector extends longitudinally along a central axis of the lens so that the first surface and the second surface of the reflector face in directions that are perpendicular to the central axis of lens.

4. The vehicle lamp of claim 1, wherein the first surface of the reflector comprises:
   a high-beam reflective part that is configured to reflect, to the lens, a partial amount of the first light that is generated by the first light source part of the light source unit; and
   a high-beam non-reflective part that is configured not to reflect, to the lens, the first light that is generated by the first light source part of the light source unit,
   wherein the high-beam reflective part and the high-beam non-reflective part of the first surface of the reflector are configured to selectively reflect the first light that is generated by the first light source part towards the lens to output a high-beam light distribution pattern from the vehicle lamp.

5. The vehicle lamp of claim 4,
   wherein the high-beam non-reflective part of the first surface of the reflector comprises a planar surface, and
   wherein the high-beam reflective part of the first surface of the reflector comprises at least one curved surface having a first curvature.

6. The vehicle lamp of claim 4, further comprising:
   a first light-transmissive shield disposed on the first surface of the reflector and overlapping at least a portion of the high-beam reflective part of the first surface of the reflector, and configured to selectively transmit therethrough, to the underlying high-beam reflective part of the first surface of the reflector, at least a partial amount of the first light that is generated by the first light source part of the light source unit; and
   at least one processor configured to control a light transmittance of the first light-transmissive shield to selectively transmit therethrough light to form any one of a plurality of high-beam light distribution patterns that is output from the vehicle lamp.

7. The vehicle lamp of claim 6, further comprising:
   a communication unit configured to receive at least one signal from at least one electronic component provided in a vehicle,
   wherein the at least one processor is configured to select a high-beam light distribution pattern based on a signal received through the communication unit.

8. The vehicle lamp of claim 1, wherein the second surface of the reflector comprises:
   a low-beam reflective part that is configured to reflect, to the lens, a partial amount of the second light that is generated by the second light source part of the light source unit; and
   a low-beam non-reflective part that is configured not to reflect, to the lens, the second light that is generated by the second light source part of the light source unit,
   wherein the low-beam reflective part and the low-beam non-reflective part of the second surface of the reflector are configured to selectively reflect the second light that is generated by the second light source part towards the lens to output a low-beam light distribution pattern from the vehicle lamp.

9. The vehicle lamp of claim 8, further comprising:
   a second light-transmissive shield disposed on the second surface of the reflector and overlapping at least a portion of the low-beam reflective part of the second surface of the reflector, and configured to selectively transmit therethrough, to the underlying low-beam reflective part of the second surface of the reflector, at least a partial amount of the second light that is generated by the second light source part of the light source unit; and
   at least one processor configured to adjust a light transmittance of the second light-transmissive shield to form any one of a plurality of low-beam light distribution patterns that is output from the vehicle lamp.

10. A vehicle lamp comprising:
    a light source unit comprising one or more light sources and that is configured to generate light;
    a reflector configured to reflect at least part of the light that is generated by the light source unit; and
    a lens configured to transmit therethrough a first portion of the light that is generated by the light source unit and that is reflected by the reflector to the lens,
    wherein the reflector comprises:
       a reflective part that is configured to reflect, to the lens, the first portion of the light that is generated by the light source unit; and
       a non-reflective part that is configured not to reflect, to the lens, the light that is generated by the light source unit,
    wherein the reflective part and the non-reflective part of the reflector are configured to selectively reflect the light that is generated by the light source unit towards the lens to output a light distribution pattern from the vehicle lamp, and wherein a light-transmissive shield is disposed to overlap at least a portion of the reflective part of the reflector, arranged between the reflector and the light source unit, and configured to have a variably-controlled light transmittance.

11. The vehicle lamp of claim 10, wherein the vehicle lamp further comprises:
at least one processor configured to control the light-transmissive shield to variably control the light transmittance of the light-transmissive shield according to a selected light distribution pattern among a plurality of light distribution patterns, so that the light-transmissive shield selectively transmits therethrough the light that is generated by the light source unit to output the selected light distribution pattern from the vehicle lamp.

12. The vehicle lamp of claim 11, wherein
the light-transmissive shield comprises a first shield part having a first light transmittance and a second shield part having a second light transmittance, and
a position and a size of at least one of the first shield part or the second shield part of the light-transmissive shield are configured to be variably controlled according to the selected light distribution pattern.

13. The vehicle lamp of claim 11, wherein the at least one processor is configured to control the light-transmissive shield to variably control the light transmittance of the light-transmissive shield according to the selected light distribution pattern by:
adjusting the light transmittance of the light-transmissive shield to output the selected light distribution pattern from the vehicle lamp with a gradated transmittance across a cut-off line, wherein a first side of the cut-off line of the selected light distribution pattern is illuminated with a first light transmittance, the cut-off line of the selected light distribution pattern is illuminated with a second light transmittance less than the first light transmittance, and a second side of the cut-off line, opposite the first side, of the selected light distribution pattern is illuminated with a third light transmittance less than the second light transmittance.

14. The vehicle lamp of claim 11, wherein
the light-transmissive shield comprises a plurality of pixels having a predetermined size, and each pixel is configured to have an individually controllable light transmittance.

15. The vehicle lamp of claim 14, wherein the plurality of pixels of the light-transmissive shield are arranged in a matrix form.

16. The vehicle lamp of claim 1, wherein the non-reflective part of the reflector is anodized.

17. The vehicle lamp of claim 16, wherein the non-reflective part of the reflector is colored to have a predetermined color.

18. The vehicle lamp of claim 17, wherein the reflective part of the reflector is composed of aluminum.

19. A vehicle lamp comprising:
a first light source part configured to be oriented to output first light in a first direction;
a second light source part configured to be oriented to output second light in a second direction different from the first direction;
a reflector comprising:
a first surface configured to reflect the first light generated by the first light source part; and
a second surface configured to reflect the second light generated by the second light source part; and
a lens configured to transmit therethrough at least a portion of light that is reflected by the reflector,
wherein the vehicle lamp further comprises:
a light-transmissive shield disposed to overlap at least a portion of the first surface of the reflector, and configured with a light transmittance that is variably controllable; and
at least one processor configured to control the light transmittance of the light-transmissive shield to selectively transmit therethrough light to form any one of a plurality of light distribution patterns that is output from the vehicle lamp.

* * * * *